United States Patent [19]
Wilson et al.

[11] Patent Number: 6,037,440
[45] Date of Patent: Mar. 14, 2000

[54] CROSS-LINKED LINEAR (2-CYANOACETAMIDO) REACTIVE POLYURETHANES

[75] Inventors: John C. Wilson, Rochester; William B. Vreeland, Webster, both of N.Y.

[73] Assignee: Eastman Kodak Company, Rochester, N.Y.

[21] Appl. No.: 09/022,080

[22] Filed: Feb. 11, 1998

Related U.S. Application Data

[63] Continuation-in-part of application No. 08/903,619, Jul. 31, 1997, abandoned.

[51] Int. Cl.[7] .................................................. C08G 18/02
[52] U.S. Cl. ...................... 528/243; 528/267; 528/367; 525/453; 525/456; 525/457
[58] Field of Search .................................... 525/453, 456, 525/457; 528/243, 267, 367

[56] References Cited

U.S. PATENT DOCUMENTS

| | | | |
|---|---|---|---|
| 3,334,097 | 8/1967 | Santilli et al. | 260/247.5 |
| 4,879,365 | 11/1989 | Petschke et al. | 528/49 |
| 5,552,496 | 9/1996 | Vogt-Birnbrich et al. | 525/440 |

OTHER PUBLICATIONS

Moszner et al. in Polymer Bulletin, vol. 33, pp. 43–49 (1994), Reaction behaviour of monomeric B–ketoesters.

Clauss et al., in Justus Liebigs Ann. Chem. (1974) pp. 561–592, Reaktionen der Aldehyde und Ketone mit Chlor– und Fluorsulfonylisocyanat.

Santilli and Osdene in Journal of Organic Chemistry (1964), vol. 29, pp. 2066–2068, 8,9,10,11–Tetrahydro–12H–benzo[5,6]quinoxalino[2,3–E][1,4]diazepin–12–ones. Examples Of A New Heterocyclic Ring System.

Taub and Petschke in Modern Paint and Coatings (Jul. 1989), 79(7), pp. 41–48, Polyfunctional Isocyanate–Oxazolidine Resins: Useful In Clear Topcoat Refinishing.

Tilak, Ayyangar & Rao in Indian Journal of Chemistry, vol. 23B, 18–23 (1984), Synthesis of Heterocyclic Compounds: Part XXV[a]—Synthesis & Reactions of 6–Cyano–2,3–dihydro–7–methyl–oxazolo[3,2–a]pyrid–5(H)–one.

Shulze in Journal für praktische Chemie, Band 311 (1969) Heft 3, S. 353–528, Reaktionen von Cyanacetylamino–Verbindungen mit p–Nitroso–N.N–bis–(β–chlor äthyl)–anilin und p–Nitroso–N,N–bis(βhydroxy äthyl)–anilin.

*Primary Examiner*—Rachel Gorr
*Attorney, Agent, or Firm*—Doreen M. Wells

[57] ABSTRACT

Polyurethanes with reactive 2-cyanoacetamido moieties are cross-linked with selected electrophiles to give polyurethanes with increased network density.

16 Claims, 9 Drawing Sheets

CROSS-LINKED LINEAR (2-CYANOACETAMIDO) REACTIVE POLYURETHANES

CROSS REFERENCE TO RELATED APPLICATIONS

This application is a continuation-in-part of U.S. application: U.S. Ser. No. 08/903,619, filed Jul. 31, 1997 of Wilson and Vreeland, titled "(2-CYANOACETAMIDO) REACTIVE POLYURETHANES WITH INCREASED NETWORK DENSITY", now abandoned.

This application is also related to the following commonly owned U.S. applications filed on even date herewith: U.S. Ser. No. 08/903,617, Filed Jul. 31, 1997, of Wilson and Vreeland, titled "CROSS-LINKED LINEAR (2-CYANO-ACETAMIDO) REACTIVE POLYURETHANES" and U.S. Ser. No. 08/904,112, filed Jul. 31, 1997 of Wilson and Vreeland, titled "LINEAR (2-CYANOACETAMIDO) REACTIVE POLYURETHANES" now abandoned in favor of continuation-in-part US Serial No. 09/022,082 filed on even date herewith.

FIELD OF THE INVENTION

This invention relates to novel polyurethanes and methods of making such polyurethanes.

BACKGROUND OF THE INVENTION

The preparation of different types of reactive polyurethanes continues to be of interest in the coatings and other industries and in general for diverse applications where polymers with enhanced physical properties are sought. There are numerous reports describing the reaction of isocyanates with active methylene compounds.

For example, Moszner et al. in Polymer Bulletin, Vol. 33, pp. 43–49 (1994), *Reaction Behaviour of Monomeric B-Ketoesters,* reported the reaction of 2-acetoacetoxyethyl methacrylate (AAEM) with aromatic isocyanates to give adducts formed involving the active methylene moiety of AAEM. Reaction with aliphatic isocyanates failed.

Chlorosulfonyl isocyanate, reported to be the most reactive isocyanate known, is an electrophile which has been reported to react with the active methylene moiety of acetoacetic esters to give amides (Clauss et al., in Justus Liebigs Ann. Chem. ( 1974) pp. 561–592, *Reaktionen der Aldelyde und Ketone mit Chlor- und Fluorsulfonylisocyanat*).

Applicants are aware of no references which teach the present invention.

SUMMARY OF THE INVENTION

It has been unexpectedly found that (2-cyanoacetamido)-substituted glycols can be reacted with diisocyanates such as 4,4'-methylenebis(cyclohexyl isocyanate), isophorone diisocyanate and tolylene-2,4-diisocyanate to selectively give linear polyurethanes. That linear polyurethanes are formed suggests that the reactive methylene moiety of the 2-cyanoacetamido pendant group does not participate in the polymerization process but remains free to react with a variety of electrophiles to provide other linear, branched or cross-linked polymers offering a range of properties (e.g., a balance of hardness and flexibility) which can be useful in most coating applications. For example, the polyurethanes of the invention may subsequently be reacted with electrophiles such as aldehydes and epoxides with base catalysis to give polyurethanes with increased network density. It is an advantage that the present polyurethanes with reactive 2-cyanoacetamide moieties can be prepared as storage-stable prepolymers and later reacted with selected electrophiles to produce polyurethanes with selected properties.

The present invention provides polyurethanes with pendant reactive 2-cyanoacetamide moieties derived from a reaction mixture of: a) at least one 2-cyanoacetamido-substituted compound selected from 2-cyanoacetamido-substituted glycol, 2-cyanoacetamido-substituted aromatic diol, aliphatic or aromatic 2-cyanoacetamido-substituted polyol, 2-cyanoacetamido-substituted monohydroxy alcohol or phenol; and b) at least one diisocyanate or polyisocyanate.

DETAILED DESCRIPTION OF THE INVENTION

Figure 1:
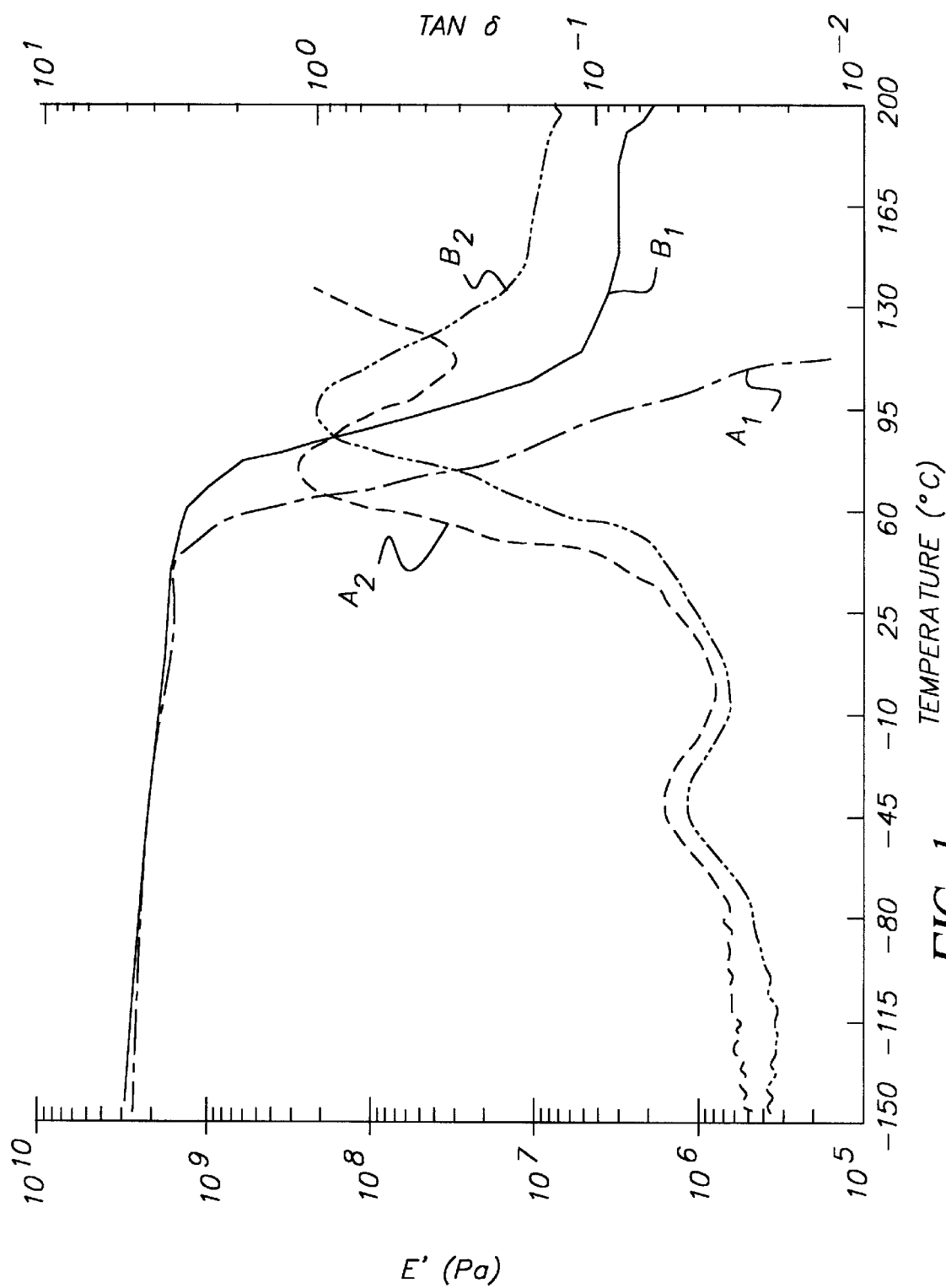

In general, (2-cyanoacetamido)-substituted glycols, aromatic diols, monohydroxy alcohol or phenol, aliphatic or aromatic polyols, are reacted with diisocyanates or polyisocyanates to provide the polyurethanes of the invention.

As used herein, the term "linear polyurethane" means a polyurethane derived from difunctional monomers (e.g., diols, diisocyanate, diamines) containing 2-cyanoacetamido functional groups where the reactive methylene moiety of the 2-cyanoacetamido functional group has not reacted to any appreciable extent with isocyanate functional groups. For example, the reaction of 2-(2-cyanoacetamido)-2-ethyl-1,3-propanediol with a diisocyanate leads to a linear polyurethane without any appreciable degree of branching and/or crosslinking when only the hydroxyl groups of the glycol and not the reactive methylene moiety react with the isocyanate functional groups of the diisocyanate.

As used herein, the term "polyurethane" describes the products formed from the reaction of diisocyanates with aliphatic and aromatic diols (urethanes), aliphatic and aromatic diamines (ureas), as well as the reaction products of isocyanates with formed urethane and urea bonds (allophonates and biurets). Furthermore, isocyanate dimers (uretidinediones) and trimers (isocyanurates), aliphatic and aromatic alcohols or phenols, aliphatic and aromatic polyols or polyamines may be present in the "polyurethane".

(2-Cyanoacetamido)-substituted glycols can be readily prepared, for example, as described by Santilli and Osdene in Journal of Organic Chemistry (1964), Vol. 29, pp. 2066–2068; in U.S. Pat. No. 3,334,097; and as exemplified in the first Example M1 below.

The following table lists exemplary glycol monomers.

TABLE I (2-Cyanoacetamido)-substituted Glycols

| Example | Glycol | Yield % | mp ° C. |
|---|---|---|---|
| M1 | 2-(2-cyanoacetamido)-2-methyl-1,3-propanediol | 87.9 | 131.5–3.5 |
| M2 | 2-(2-cyanoacetamido)-2-ethyl-1,3-propanediol | 29.6 | 63.5–5.5 |

TABLE I-continued (2-Cyanoacetamido)-substituted Glycols

| Example | Glycol | Yield % | mp ° C. |
|---|---|---|---|
| M3 | 2-(2-cyanoacetamido)-1,3-propanediol | 73.3 | 85–6.5 |
| M4 | 3-(2-cyanoacetamido)-1,2-propanediol | 78.3 | 79.5–80.5 |

Other co-monomers which may be useful in the present invention include low molecular weight glycols such as ethylene glycol and 1,4-butanediol, aromatic diols such as bisphenol A, triol crosslinking agents such as glycerol and trimethylolpropane, high molecular weight polyether polyols such as poly(ethylene glycol), poly(propylene glycol) and poly(tetramethylene glycol), hydroxy terminated polyesters such as poly(ethylene adipate), poly-(2,2'-oxydiethylene adipate) and polycaprolactonediol, aromatic diamines such as ring substituted 4,4'-di-aminodiphenylmethanes and m-phenylenediamines, substituted and unsubstituted aliphatic diamines such as ethylene diamine, 2-methyl-1,5-pentanediamine and hexamethylene diamine, diisocyanates such as tolylene diisocyanate (TDI), methylene di-p-diphenylene diisocyanate (MDI), 4,4'-methylenebis(cyclohexyl isocyanate) (RMDI or $H_{12}MDI$), isophorone diisocyanate (IPDI) and 1,6-hexamethylene diisocyanate (HDI) and higher functional polyisocyanates such as 4,4',4"-triisocyanatotriphenylmethane.

The following equation is representative of the claimed synthesis of linear polyurethanes from (2-cyanoacetamido)-substituted glycols and diisocyanates:

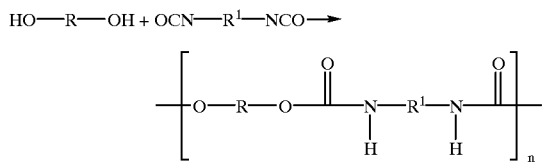

where
R'=alkylene, arylene, alkylenediarylene or arylenedialkylene; and
R may be

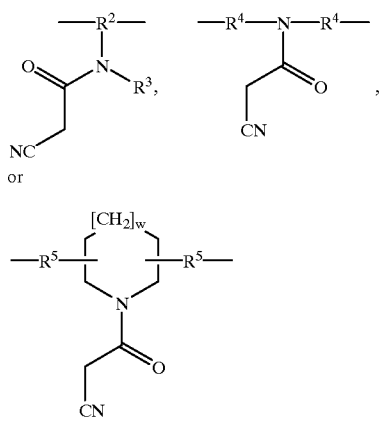

where $R^2$=substituted or unsubstituted aliphatic triyl or aromatic triyl
$R^3$=H or alkyl
$R^4$=alkylene and may be the same or different
$R^5$=alkylene or a covalent bond and may be the same or different w=0,1 or 2

Representative 2-cyanoacetamido-substituted glycols or aromatic diols useful in the preparation of the polyurethanes of the invention include:
2-(2-cyanoacetamido)-2-butyl-1,3-propanediol
2-(2-cyanoacetamido)-2-isopropyl-1,3-propanediol
2-(2-cyanoacetamido)-2-pentyl-1,3-propanediol
2-(2-cyanoacetamido)-2-propyl-1,3-propanediol
2-(2-cyanoacetamido)-2-ethoxymethyl-1,3-propanediol
2-(2-cyanoacetamido)-2-phenyl-1,3-propanediol
2-(2-cyanoacetamido)methyl-1,3-propanediol
2-[3-(2-cyanoacetamido)propyl]-1,3-propanediol
2-[4-(2-cyanoacetamido)phenyl]-1,3-propanediol
N,N-bis(2-hydroxyethyl)-2-cyanoacetamide
N,N-bis(2-hydroxypropyl)-2-cyanoacetamide
6-(2-cyanoacetamido)-1,2-hexanediol
3-(2-cyanoacetamido)-1,2-octadecanediol
2-(2-cyanoacetamido)-1,3-octadecanediol
2-(2-cyanoacetamido)-8-methyl-1,3-octadecanediol
2-(2-cyanoacetamido)-9-methyl-1,3-octadecanediol
2-(2-cyanoacetamido)-16-methyl-1,3-octadecanediol
4-(2-cyanoacetamido)-1,3-cyclohexanediol
3-(2-cyanoacetamido)-1,2-cyclohexanediol
N-(2-cyanoacetyl)-2,6-piperidinedimethanol
N-(2-cyanoacetyl)-3,4-piperidinediol
N-(2-cyanoacetyl)-3,5-piperidinediol
4-(2-cyanoacetamido)-1,3-benzenediol
5-(2-cyanoacetamido)-1,3-benzenediol
2-(2-cyanoacetamido)-1,4-benzenediol
2-(2-cyanoacetamido)-1,4-benzenedimethanol
2-(2-cyanoacetamido)-1,5-naphthalenedimethanol
2-(2-cyanoacetamido)-1,7-naphthalenedimethanol
2-(2-cyanoacetamido)-1,8-naphthalenedimethanol
5-(2-cyanoacetamido)-1,4-naphthalenedimethanol.

Representative of

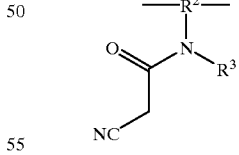

are the following:

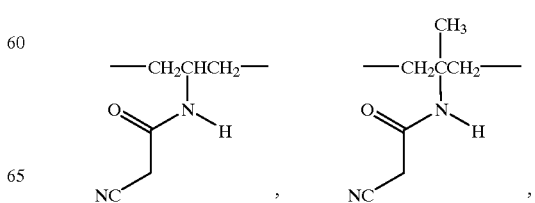

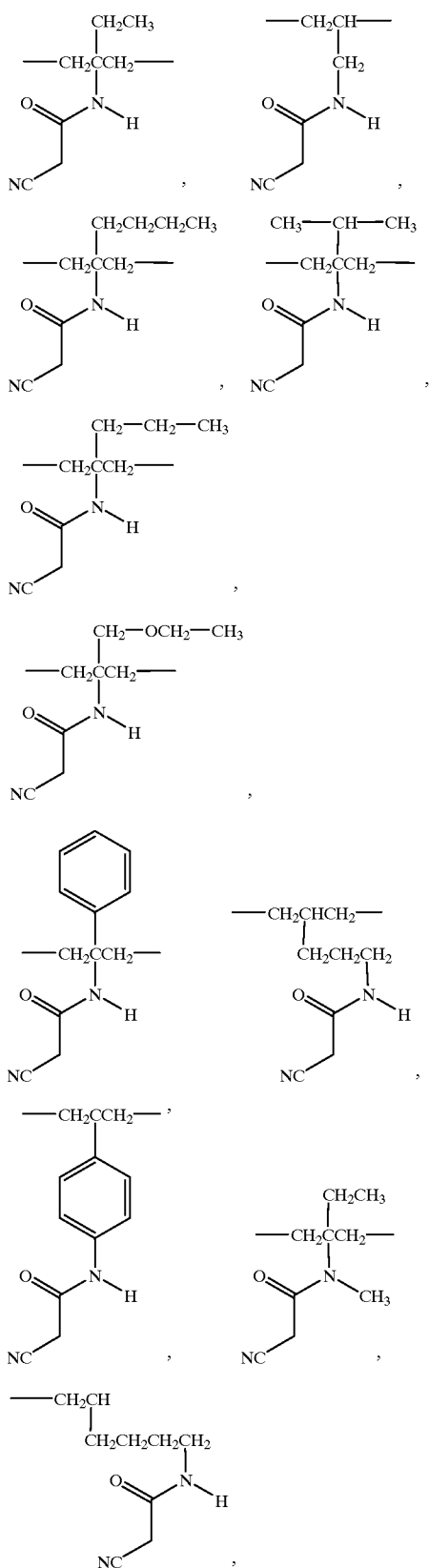
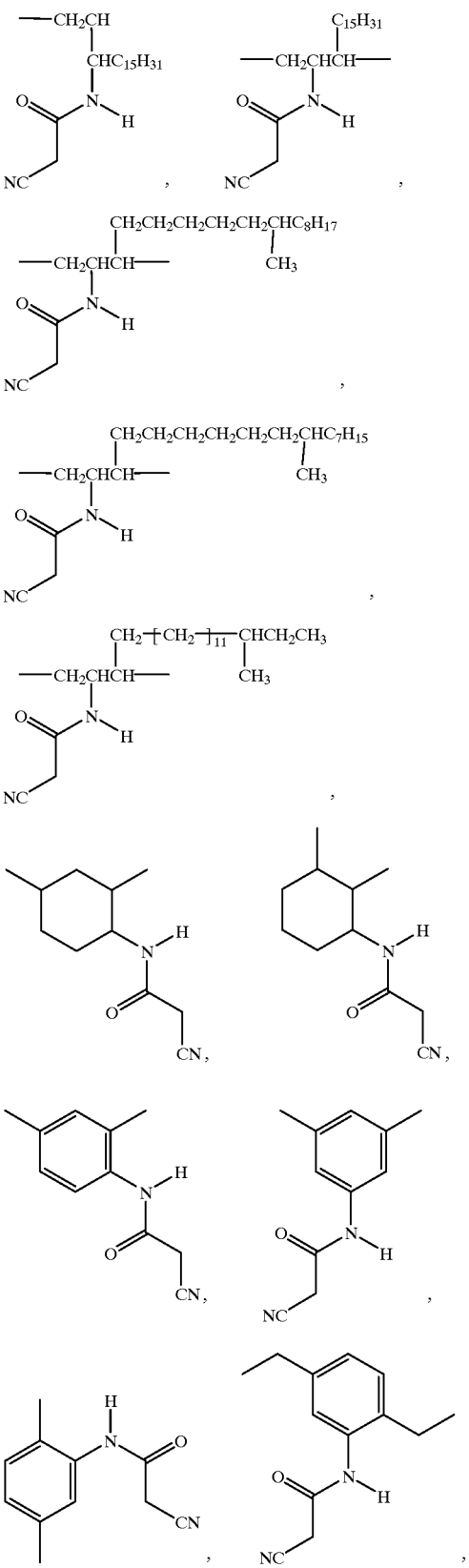

-continued
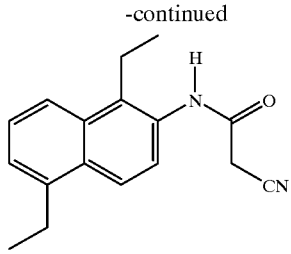
,
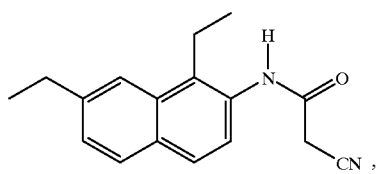
,
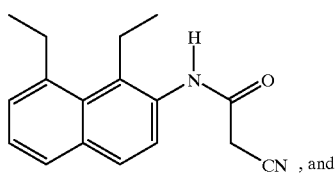
, and
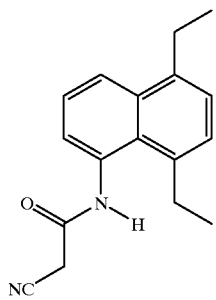
Representative of
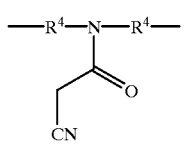
are the following:
—CH₂CH₂—N—CH₂CH₂—,
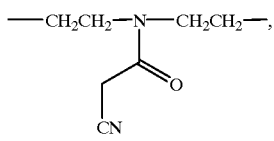
and
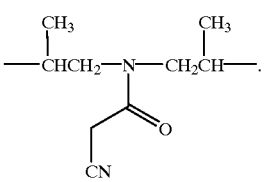
.
Representative of
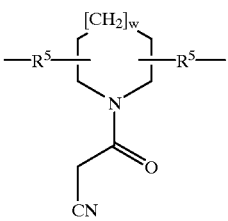
are the following:
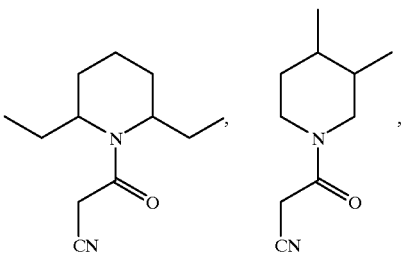
and
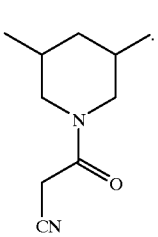
.
Properties and general formula of some of the claimed polyurethanes are listed in the following table:

TABLE II

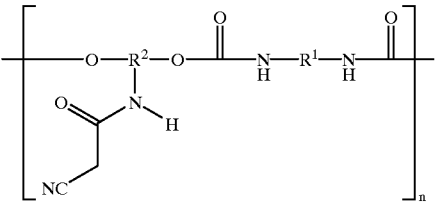

b = polymerization solvent
c = PEO equivalent molecular weight
IV = inherent viscosity Besides the (2-cyanoacetamido)-containing monomers used to prepare the polymers of the invention, additional comonomers of diverse structure and functionality commonly used in the art may be added to prepare polymers with a wide range of physical properties. Representative materials include mono- di- and polyfunctional alcohols, phenols, aliphatic amines, aromatic amines, aliphatic isocyanates and aromatic isocyanates.

The following equation illustrates the use of hydroxy-terminated polymers to give polyurethanes of the invention:

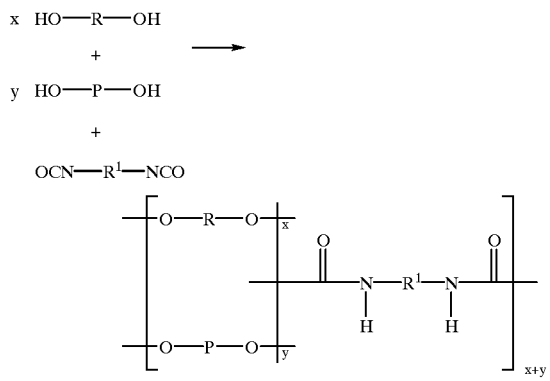

where R and $R^1$ are as defined above; and
HO—P—OH = hydroxy terminated polymer; and
x and y represent mole percent whose sum=100

Properties of polyurethanes derived from 2-(2-cyanoacetamido)-2-ethyl-1,3-propanediol, poly[tetramethylene glycol] and 4,4'-methylenebis(cyclohexyl isocyanate) (RMDI) are listed in the following Table III:

hydroxy functionality of 3, such as 2-(2-cyanoacetamido)-2-hydroxymethyl-1,3-propanediol (B), may be used to give branched and crosslinked polyurethanes.

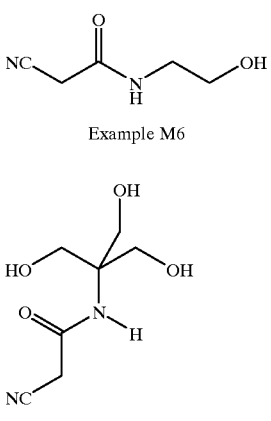

Example M6

Example M7

Branched and/or crosslinked polyurethanes may also be prepared by introducing polyols, polyamines or polyisocyanates with a functionality greater than 2 into the monomer

TABLE III

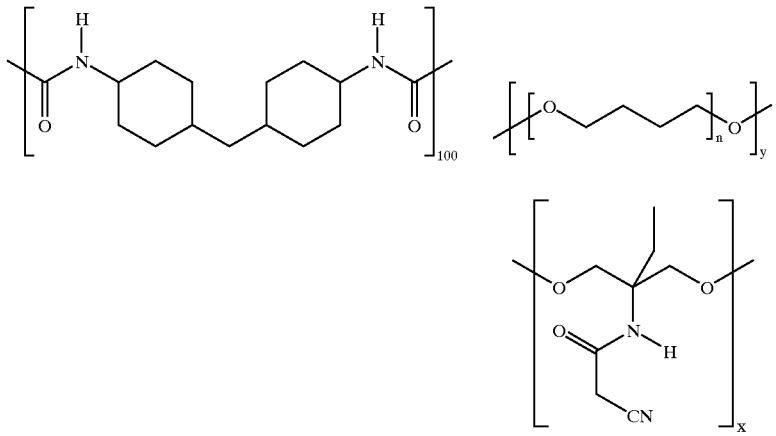

| Polyurethane | PTMG[a] | n | y[c] | x[c] | Mn[b] | Mw[b] | Mw/Mn |
|---|---|---|---|---|---|---|---|
| #9 | 90 | 1.00 | 50 | 50 | 14,700 | 34,000 | 2.31 |
| #10 | 250 | 3.22 | 50 | 50 | 12,000 | 25,400 | 2.12 |
| #11 | 650 | 8.76 | 50 | 50 | 17,900 | 42,600 | 2.38 |
| #12 | 1000 | 13.62 | 25 | 75 | 13,000 | 27,000 | 2.08 |
| #13 | 1000 | 13.62 | 50 | 50 | 15,200 | 29,700 | 1.95 |
| #14 | 2000 | 27.49 | 50 | 50 | 14,700 | 32,900 | 2.24 |
| #15 | 2900 | 39.97 | 50 | 50 | 15,000 | 30,600 | 2.04 | a = PTMG molecular weight
b = PEO equivalent molecular weight
c = mole percent
n = average repeat unit value for PTMG and polymerization solvent = THF In still another embodiment of the invention, (2-cyanoacetamido)-containing monomers may have hydroxyl functionality other than with a value of 2. For example, monohydroxy (2-cyanoacetamides), such as, N-(2-hydroxyethyl)-2-cyanoacetamide (A) may be employed to give polyurethanes with (2-cyanoacetamido)-terminal groups. Furthermore, trihydroxy (2-cyanoacetamides) with a feed. In addition, the use of excess diisocyanate in the monomer feed can be used to provide crosslinked polyurethanes.

In another embodiment of the invention, water dispersible (2-cyanoacetamido)-containing polyurethanes may be prepared by incorporation of the triethylammonium salt of dimethylolpropionic acid.

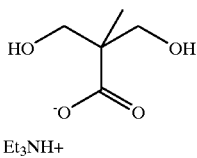

Et₃NH+

Polyurethanes may also be prepared by the inclusion of aromatic and aliphatic diamines in the monomer feed. The following equation illustrates the synthesis of polyurethanes from 2-cyanoacetamido glycols, hydroxy terminated polymers, diisocyanates and diamines:

phonate and biuret formation are also considered to fall within the scope of the invention.

The polyurethanes of the invention contain pendant reactive methylene moieties which are known to undergo base catalyzed reactions with a variety of electrophilic reagents such as aldehydes, ketones, imines, activated olefins, alkyl halides and epoxides. The polyurethanes may be crosslinked with aldehydes and epoxides in the presence of base. The aldehyde can be added or generated in situ.

For example, the polyurethanes may be cross-linked with added aldehyde:

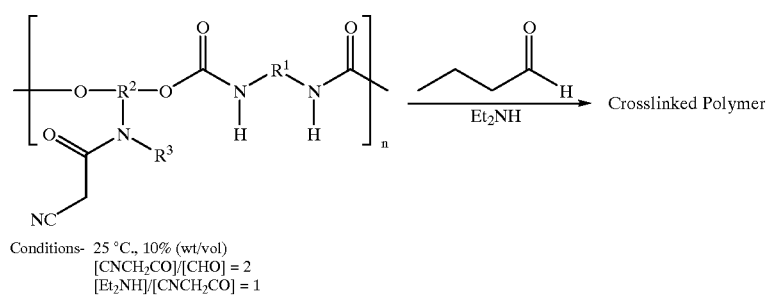

Crosslinking of 2-(2-Cyanoacetamido)-2-alkyl-1, 3-propanediol Polyurethanes with Butyraldehyde Conditions- 25 °C., 10% (wt/vol)
[CNCH₂CO]/[CHO] = 2
[Et₂NH]/[CNCH₂CO] = 1

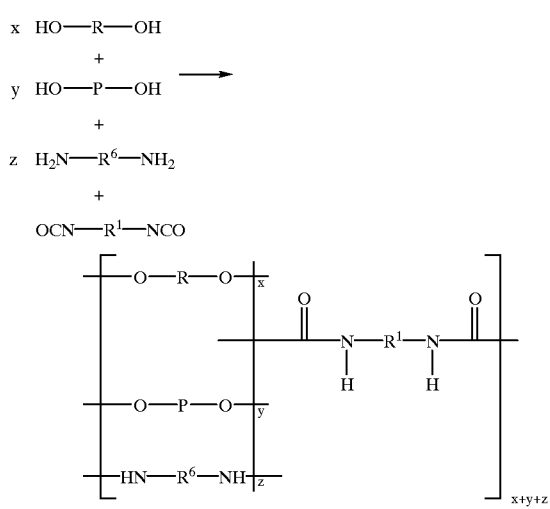

where R and $R^1$ are as defined above;
HO—P—OH=hydroxy terminated polymer;
$R^6$=alkylene, arylene, alkylenediarylene or arylenedialkylene;
x, y and z=mole percent whose sum=100

Preparative methods may also vary widely. For example, both one shot and prepolymer methods of preparation as well as solution, emulsion/dispersion and bulk synthesis procedures may be employed. One shot preparation of polyurethanes is the process of mixing all of the formulation components at the same time. Prepolymer preparation is the process of reacting polyol with excess diisocyanate to give a prepolymer which is subsequently chain extended by the addition of polyol or polyamine chain extenders. Variations in the stoichiometry of reactants which can influence allo- The following table shows gel times determined for solutions of various polyurethanes of the invention in DMF or THF on mixing with butyraldehyde and diethylamine catalyst at 25° C.

TABLE IV

| $R^1$ | $O-R^2-O$ <br> $N$ | Solvent | Gel Time min |
|---|---|---|---|
| RM | —CH₂C(CH₃)CH₂— | DMF | 1.67 |
| I | —CH₂C(CH₃)CH₂— | DMF | 1.75 |
| T | —CH₂C(CH₃)CH₂— | DMF | instantly |

TABLE IV-continued

| RM | $\mathrm{-CH_2\underset{\underset{C_2H_5}{|}}{C}CH_2-}$ | THF | 6.25 |
|---|---|---|---|
| I | $\mathrm{-CH_2\underset{\underset{C_2H_5}{|}}{C}CH_2-}$ | THF | 18.50 |
| T | $\mathrm{-CH_2\underset{\underset{C_2H_5}{|}}{C}CH_2-}$ | THF | 2.08 |

Moisture cured polyurethanes may be prepared by copolymerization of (2-cyanoacetamido)-substituted glycols with 3-oxazolidineethanols, and hydroxy terminated polymers and diisocyanates. The oxazolidine-terminated polyurethanes thus prepared are believed to hydrolyze to aldehyde and secondary amine which subsequently lead to crosslinking of the resultant hydrolyzed polyurethane. The following equation is illustrative of the process:

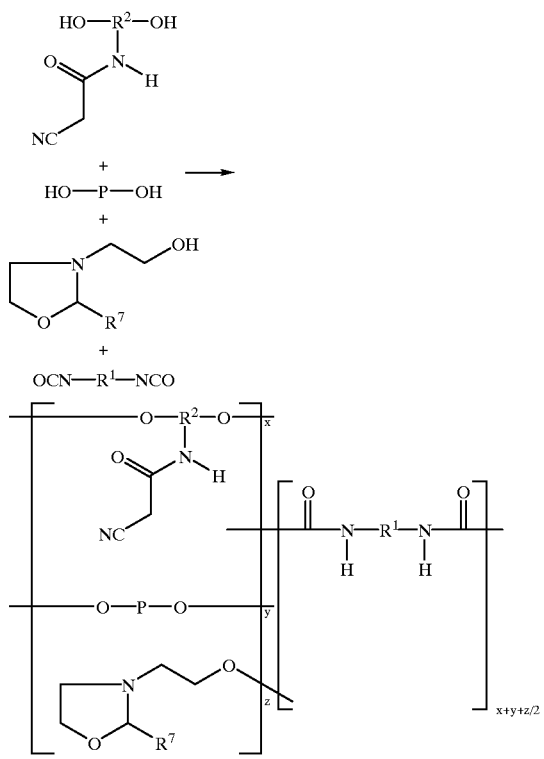

where $R^1, R^2$ and H—P—OH are as defined above;

$R^7$=H or alkyl; and x+y+z/2 are mole percent whose sum=100

It has also been found that unbound 3-oxazolidineethanols may be used as a source aldehyde and secondary amine for the moisture cure of (2-cyanoacetamido)-containing polyurethanes.

Taub and Petschke, U.S. Pat. No. 4,879,365, reported the preparation of storage-stable polyurethanes from polyfunctional isocyanate prepolymers with a deficiency of N-(2-hydroxyethyl)oxazolidines. The resultant polyurethanes, when applied to substrates, hydrolyze to aminoalcohols and aldehydes. The aminoalcohols formed react with excess isocyanate to increase network density of the polyurethanes. However, the reaction of generated aldehydes with reactive methylene moieties is not disclosed.

Films cast from solutions of polyurethanes derived from 2-(2-cyanoacetamido)-2-ethyl-1,3-propanediol, 4,4'-methylenebis(cyclohexyl isocyanate) and poly(tetramethylene glycol) together with Bisphenol A/epichlorohydrin epoxy resin with 2-phenyl-2-imidazoline catalyst were cured and rendered insoluble.

Preparation of Monomers

M1 2-(2-Cyanoacetamido)-2-methyl-1,3-propanediol

A mixture of 52.57 g (0.50 mol) of 2-amino-2-methyl-1,3-propanediol, 49.55 g (0.50 mol) of methyl cyanoacetate and 100 ml of acetonitrile was heated at reflux for 1 hr and cooled. Solid crystallized and was collected, washed with acetonitrile and dried. The yield of product was 75.65 g (87.9% of theory); mp=131.5–3.5° C. (rep$^a$ mp=130.5–1.5° C.)

a) J. Org. Chem., 29, 2066 (1964)

M2 2-(2-Cyanoacetamido)-2-ethyl-1,3-propanediol

A solution of 357.48 g (3.0 mol) of 2-amino-2-ethyl-1,3-propanediol, 297.27 g (3.0 mol) of methyl cyanoacetate and 600 ml of acetonitrile was heated on a steam bath for 2.5 hrs and cooled. The solution was concentrated to an amber oil which was then dissolved in 1200 ml of ethyl acetate, seeded and stirred. Solid crystallized and was collected, washed with ethyl acetate and dried. The filtrate gave a second crop on standing which was similarly collected, washed and dried. The yield of first crop was 151.1 g; mp=62.5–4.5° C. and of 2nd crop was 33.6 g; mp=62.5–5.5° C. Both crops were combined and recrystallized again from ethyl acetate, collected, washed with ethyl acetate and dried. The yield of product was 165.2 g (29.6% of theory); mp=63.5–5.5° C.

M3 2-(2-Cyanoacetamido)-1,3-propanediol

A mixture of 18.22 g (0.20 mol) of 2-amino-1,3-propanediol, 19.82 g (0.20 mol) of methyl cyanoacetate and 40 ml of acetonitrile was heated on a steam bath for 2 hrs and cooled. The reaction mixture was concentrated to a viscous oil which was treated with warm ethyl acetate, cooled, isolated and treated with ethyl acetate and scratched to crystallize. The solid was collected, recrystallized from ethanol, collected, washed with ethanol and dried. The yield of product was 23.18 g (73.3% of theory); mp=85–6.5° C.

M4 3-(2-Cyanoacetamido)-1,2-propanediol

A mixture of 45.56 g (0.50 mol) of 3-amino-1,2-propanediol, 49.55 g (0.50 mol) of methyl cyanoacetate and 100 ml of acetonitrile was heated on a steam bath for 2.83 hrs and cooled. The reaction mixture was cooled and concentrated. Ethyl acetate was added to the residue which on standing, crystallized. The solid was collected, recrystallized from ethanol, collected, washed with ethanol and dried. The yield of product was 61.9 g (78.3% of theory); mp=79.5–80.5° C.

M5 N,N-Bis(2-hydroxyethyl)-2-cyanoacetamide

A solution of 10.82 g (103 mmol) of diethanolamine, 10.20 g (103 mmol) of methyl cyanoacetate and 20 ml of acetonitrile was heated on a steam bath for 50 minutes and cooled. The reaction mixture was then concentrated to a viscous oil.

M6 N-(2-Hydroxyethyl)-2-cyanoacetamide

Methyl cyanoacetate (49.55 g, 0.50 mol) was added dropwise to 30.55 g (0.50 mol) of ethanolamine. An exothermic reaction ensued requiring the addition of 50 ml of acetonitrile early in the addition. The addition was complete within 5 minutes after which the reaction mixture was stirred for 1.25 hrs and concentrated to a red-brown oil. The oil crystallized after seeding with material which was recrystallized from ethyl acetate. The crystalline material was recrystallized from ethyl acetate with seeding. The solid was collected, washed with ethyl acetate and dried to give 49.75 g (77.66% of theory) of product; mp=56–9° C. (rep[a] mp=61–2° C.).

a) Ind. J. Chem., 23B, 18 (1984)

M7 2-(2-Cyanoacetamido)-2-hydroxymethyl-1,3-propanediol

A mixture of 11.30 g (100 mmol) of ethyl cyanoacetate, 8.90 g (73.5 mmol) of tris(hydroxymethyl)aminomethane, 20 ml of ethanol and 10 ml of DMF was heated on a steam bath for 1.25 hrs and cooled. On scratching the flask walls, solid crystallized and was collected, washed with ethanol and dried. The yield of product was 8.74 g; mp=130–2° C. A second recrystallization from ethanol gave 4.6 g of product; mp=131–3 ° C. (rep[a] mp=134–5° C.).

a) J. Prakt. Chem., 311, 353 (1969)

Preparation of Polyurethanes Polymerization of 2-(2-Cyanoacetamido)-2-ethyl-1,3-propanediol and 4,4'-Methylenebis(cyclohexyl isocyanate) [Polyurethane #5]

A solution of 13.12 g (50 mmol) of 4,4'-methylenebis (cyclohexyl isocyanate), 9.31 g (50 mmol) of 2-(2-cyanoacetamido)-2-ethyl-1,3-propanediol, 22.43 g of THF and two drops of dibutyltin dilaurate was heated in a 60° C. bath under nitrogen for 18.75 hrs. The polymerization mixture was diluted with 50 ml of THF and a few drops of water to give a dope determined to contain 26.59% solids.

Polymerization of 3-(2-Cyanocetamido)-1,2-propanediol and 4,4'-Methylenebis(cyclohexyl isocyanate) [Polyurethane #8]

A solution of 7.91 g (50 mmol) of 3-(2-cyanocetamido)-1,2-propanediol, 13.12 g (50 mmol) of 4,4'-methylenebis (cyclohexyl isocyanate), 21.03 g of DMF and 2 drops of dibutyltin dilaurate was heated under nitrogen in a 60° C. bath for 16.5 hrs. The polymerization mixture was diluted with 50 ml of DMF and poured into aqueous methanol. The precipitated polymer was isolated, redissolved in THF and reprecipitated in water. The polymer was isolated and washed and ground up in a high speed blender. The polymer was collected and dried giving 13.44 g.

Polymerization of 2-(2-Cyanoacetamido)-1,3-propanediol and 4,4'-Methylenebis(cyclohexyl isocyanate) (Polyurethane #1)

A solution of 7.91 g (50 mmol) of 2-(2-cyanoacetamido)-1,3-propanediol, 13.12 g (50 mmol) of 4,4'-methylenebis (cyclohexyl isocyanate), 21.03 g of DMF and 2 drops of dibutyltin dilaurate was heated in a 60° C. bath under nitrogen for 16 hrs. The solution was diluted with 50 ml of DMF, heated for another 1 hr to dissolve and cooled. The polymer was precipitated in water, isolated, ground up in water in a high speed blender, isolated and redissolved in THF. The polymer was reprecipitated in water, isolated, ground up in water in a high speed blender, collected and dried. The yield of polymer was 20.82 g.

Copolymerization of 2-(2-Cyanoacetamido)-2-methyl-1,3-propanediol, Poly(propylene glycol-1000), 3,5-Diethyltoluene-2,4/6-diamine and 4,4'-Methylenebis(cyclohexyl isocyanate)

Poly(propylene glycol-1000), 25.00 g (25 mmol), was dried on a steam bath at reduced pressure. To the dried polymer was added 4.30 g (25 mmol) of 2-(2-cyanoacetamido)-2-methyl-1,3-propanediol, 15.74 g (60 mmol) of 4,4'-methylenebis(cyclohexyl isocyanate), 93.64 g of DMF and 5 drops of dibutyltin dilaurate. The resultant solution was stirred in an 80° C. bath under nitrogen for 2 hrs. To this prepolymer was then added 1.78 g (10 mmol) of 3,5-diethyltoluene-2,4/6-diamine (Ethacure-100) and the solution was heated at 80° C. for another 2 hrs and cooled.

Size exclusion chromatography gave poly(ethylene oxide) equivalent molecular weights of:

Mn=5,090

Mw=10,700

Mw/Mn=2.10

Copolymerization of 2-(2-Cyanoacetamido)-2-ethyl-1,3-propanediol, Poly(tetramethylene glycol)-650 and 4,4'-Methylenebis(cyclohexyl isocyanate) (Polyurethane #11)

A solution of 16.25 g (25 mmol) of poly(tetramethylene glycol)-650, 4.66 g (25 mmol) of 2-(2-cyanoacetamido)-2-ethyl-1,3-propanediol, 13.12 g (50 mmol) of 4,4'-methylenebis(cyclohexyl isocyanate), 34.03 g of THF and 2 drops of dibutyltin dilaurate under nitrogen was heated in a 60° C. bath for 21 hrs and cooled. THF (50 ml) was added to give a 30.25% solids dope.

Chain Termination Copolymerization of N-(2-Hydroxyethyl)-2-cyanoacetamide, Poly(tetramethylene glycol)-1000 and 4,4'-Methylenebis(cyclohexyl isocyanate)

A solution of 45.00 g (45 mmol) of poly(tetramethylene glycol)-1000, 1.28 g (10 mmol) of N-(2-hydroxyethyl)-2-cyanoacetamide, 13.12 g (50 mmol) of 4,4'-methylenebis (cyclohexyl isocyanate), 59.40 g of THF and 2 drops of dibutyltin dilaurate was heated under nitrogen in a 60° C. bath for 21.17 hrs and cooled.

Size exclusion chromatography gave poly(ethylene oxide) equivalent molecular weights of:

Mn=6,300

Mw=12,400

Mw/Mn=1.97

Branching Polymerization of N-[Tris(hydroxymethyl)methyl]-2-cyanoacetamide and 4,4'-Methylenebis(cyclohexyl isocyanate)

A solution of 12.59 g (66.9 mmol) of N-[tris(hydroxymethyl)-methyl]-2-cyanoacetamide, 13.12 g (50 mmol) of 4,4'-methylenebis(cyclohexyl isocyanate), 25.71 g of DMF and 2 drops of dibutyltin dilaurate was heated in a 60° C. bath under nitrogen for 17.17 hrs and cooled.

Size exclusion chromatography gave poly(ethylene oxide) equivalent molecular weights of:

Mn=1,850

Mw=3,920

Mw/Mn=2.12

Crosslinking Reaction of Polyurethane Derived from 2-(2-Cyanoacetamido)-2-ethyl-1,3-propanediol, Poly(tetramethylene glycol-1000) and 4,4'-Methylenebis(cyclohexyl isocyanate) (Polyurethane #13) with EPON 1001F™

To a solution of 3.33 g (0.623 meq) of a 32 wt % solution of polyurethane derived from 2-(2-cyanoacetamido)-2- ethyl-1,3-propanediol, poly(tetramethylene glycol-1000) and 4,4'-methylenebis(cyclohexyl isocyanate) (#13), 0.29 g (0.537 meq) of EPON 1001F™ and 7.32 g of THF was added 0.07 g of 2-phenyl-2-imidazoline. The resultant solution was coated onto a Teflon™ support and air dried for 1 hr. The film was cured at 117° C. for 30 min and determined to be insoluble in THF.

Reaction of Polyurethane Derived from 2-(2-Cyanoacetamido)-2-ethyl-1,3-propanediol and 4,4'-Methylenebis(cyclohexyl isocyanate) (Polyurethane #5) with EPON 1001F™

A solution of 3.98 g (2.2294 meq) of a 25.1 wt % solution of polyurethane derived from 2-(2-cyanoacetamido)-2-ethyl-1,3-propanediol and 4,4'-methylenebis(cyclohexyl isocyanate) (#5), 6.64 ml of THF and 3 drops of water was prepared to which was added 0.60 g (1.1147 meq) of EPON 1001F™. To the resultant solution was added 0.08 g of 2-phenyl-2-imidazoline. The resultant solution was coated onto a Teflon™ support and air dried. A sample of the dried film could be swollen with THF containing a few drops of water. The remaining film was heated in a 120° C. oven for 30 min and cooled. The resultant film was very tough and insoluble in THF containing a few drops of water.

Reaction of Polyurethane Derived from 2-(2-Cyanoacetamido)-2-ethyl-1,3-propanediol, Poly(tetramethylene glycol-1000) and 4,4'-Methylene-bis(cyclohexyl isocyanate) (Polyurethane #13) with 3-Glycidyloxypropyltrimethoxysilane A solution of 3.06 g (0.5917 meq) of a 33.1 wt % solution of polyurethane derived from 2-(2-cyanoacetamido)-2-ethyl-1,3-propanediol, poly-(tetramethylene glycol-1000) and 4,4'-methylenebis(cyclohexyl isocyanate) (#13), 0.07 g (0.2958 meq) of 3-glycidyloxypropyltrimethoxysilane, 0.05 g of 2-phenyl-2-imidazoline and 1.94 g of THF was prepared and coated onto a Teflon™ support with a 3 mil coating knife. The coating was air dried and heated in a 117° C. oven for 30 minutes. The resultant film was insoluble in THF.

Reaction of Polyurethane Derived from 2-(2-Cyanoacetamido)-2-methyl-1,3-propanediol and Isophorone Diisocyanate (Polyurethane #3) with Butyraldehyde To a solution of 1.00 g (2.54 meq) of polyurethane derived from 2-(2-cyanoacetamido)-2'-methyl-1,3-propanediol and isophorone diisocyanate (#3) in 10 ml of DMF was added 0.091 g (1.27 meq) of butyraldehyde and 0.186 g (2.54 meq) of diethylamine. The resultant solution was agitated and determined to gel after 105 sec.

Crosslinking of Polyurethane Derived from 2-(2-Cyanoacetamido)-2-ethyl-1,3-propanediol and 4,4'-Methylenebis(cyclohexyl isocyanate) (Polyurethane #5) with N-(2-Hydroxyethyl)oxazolidine and Water A solution of 4.08 g (2.42 meq) of polyurethane dope (#5) derived from 2-(2-cyanoacetamido)-2-ethyl-1,3-propanediol and 4,4'-methylene-bis(cyclohexyl isocyanate) (26.6% solids), 6.77 g of THF and 2 drops of water was prepared. To this solution was added 0.154 g (1.315 meq) of N-(2-hydroxy-ethyl)oxazolidine. The resultant solution gelled after 64.25 hrs at RT.

Polymerization of 2-(2-Cyanoacetamido)-2-ethyl-1,3-propanediol, Poly(tetramethylene glycol-1000), N-(2-Hydroxyethyl)-2-propyloxazolidine and 4,4'-Methylenebis(cyclohexyl isocyanate)

A solution of 3.185 g (20 mmol) of N-(2-hydroxyethyl)-2-propyloxazolidine, 7.45 g (40 mmol) 2-(2-cyanoacetamido)-2-ethyl-1,3-propanediol, 50.00 g (50 mmol) of poly(tetramethylene glycol-1000), 26.24 g (100 mmol) of 4,4'-methylenebis(cyclohexyl isocyanate) and 86.88 g of THF was prepared in a 60° C. bath under nitrogen. 5 drops of dibutyltin dilaurate were added and the mixture was heated under nitrogen for 21.5 hrs and cooled. The resultant dope gelled on standing for 18 days.

Polymerization of 2-(2-Cyanoacetamido)-2-ethyl-1,3-propanediol, Poly(tetramethylene glycol-1000), N-(2-Hydroxyethyl)-2-isopropyloxazolidine and 4,4'-Methylenebis(cyclohexyl isocyanate)

This polymer derived from N-(2-hydroxyethyl)-2-isopropyloxazolidine and prepared as in the previous example did not gel on standing for 51 days.

Polymerization of 2-(2-Cyanoacetamido)-2-ethyl-1,3-propanediol, Poly(tetramethylene glycol-1000), N-(2-Hydroxyethyl)oxazolidine and 4,4'-Methylenebis(cyclohexyl isocyanate)

This polymer derived from N-(2-hydroxyethyl)oxazolidine and prepared as in the previous example gelled on dilution with THF and attempting to dissolve.

Polymerization of 2-(2-Cyanoacetamido)-2-ethyl-1,3-propanediol, Poly(propylene glycol-1000), Dimethylolpropionic Acid and 4,4'-Methylenebis(cyclohexyl isocyanate)

A solution of 10.00 g (10 mmol) of dry poly(propylene glycol-1000), 1.34 g (10 mmol) of dimethylolpropionic acid, 1.86 g (10 mmol) of (2-cyano-acetamido)-2-ethyl-1,3-propanediol, 10.49 g (40 mmol) of 4,4'-methylenebis(cyclohexyl isocyanate) and 7.60 g of NMP was prepared in an 80° C. bath under nitrogen. One drop of dibutyltin dilaurate was added and the reaction mixture was heated at 80° C for 3.5 hrs and cooled. To this viscous solution was added 1.01 g (10 mmol) of triethylamine and the mixture was stirred in a 60° C. bath for 15 minutes. To this solution was added a solution of 0.60 g (10 mmol) of ethylenediamine in 40 ml of distilled water. This mixture was stirred in a 60° C. bath for 2.25 hrs to give a stable dispersion of polyurethane in water.

Preparation of Polyurethanes with Increased Network Density

Materials

EPON 1001F™ is a low molecular weight solid epoxy resin available from Shell Chemical Company. It is derived from bisphenol A and epichlorohydrin. ECN 1138™ is available from Ciba Giegy.

2-Phenyl-2-imidazoline was obtained from Aldrich and recrystallized before use.

Butyraldehyde, diethylamine and glycidyl 1, 1 ,2,2-tetrafluoroethylether were obtained from Aldrich and used as received. THF, HPLC grade, was obtained from Aldrich and dried over 4A molecular sieves.

The polyurethanes containing reactive 2-cyanoacetamido crosslinking moieties have been described above and are claimed in commonly owned application U.S. Ser. No. 09/220,082, 1998 of Wilson and Vreeland filed on even date herewith. Those reactive linear polyurethanes differ from the instant compositions in that the mole ratio between the PTMG soft segment and the 2-cyanoacetamido moiety was generally held constant at 1:1; however, one example (#12) contained a ratio of 1:3, thus increasing the 2-cyanoacetamido equivalents per gram by a factor of three.

2-(2-Cyanoacetamido)-2-ethyl-1, 3-propanediol
Polytetramethylene Glycol (RMDI) Polyurethanes

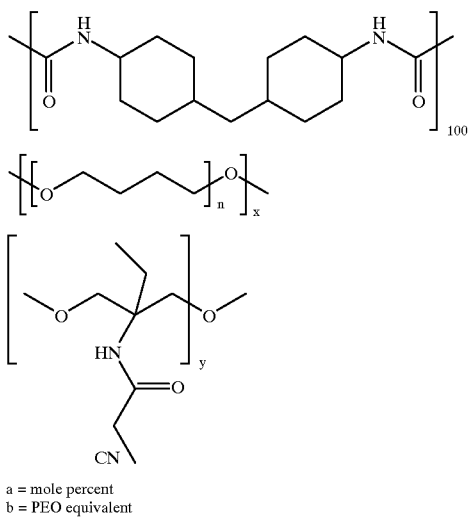

a = mole percent
b = PEO equivalent

Epoxy Crosslinked Polymer Preparation
General Preparation

A linear polyurethane was dissolved in dry THF and an epoxy resin was added to the solution. The epoxy resins used in this work were one of two commercially available epoxy: EPON 1001F™ and ECN 1138™. In all examples, the molar ratio between the 2-cyanoacetamido reactive moiety of the linear polyurethane and the epoxy resin was 1:5. Once a solution was obtained, a catalytic amount of 2-phenyl-2-imidazoline was added to the reaction. Reaction times were varied from 48 hours to 72 hours. Reaction temperatures were varied from room temperature to 69° C. (reflux). Film samples were prepared by pouring 10 mls of the reaction mixture into an open Teflon mold. Film curing times were varied from 16 hours to 24 hours. Film curing temperatures varied from 65° C. to 120° C. The most common reaction and cure conditions included a 72 hour reaction time at room temperature followed by a 16 hour room temperature film dry-down followed by a final 65° C. cure for 24 hours.

Crosslinking of 2-Cyanoacetamidopolyurethanes with Epoxides

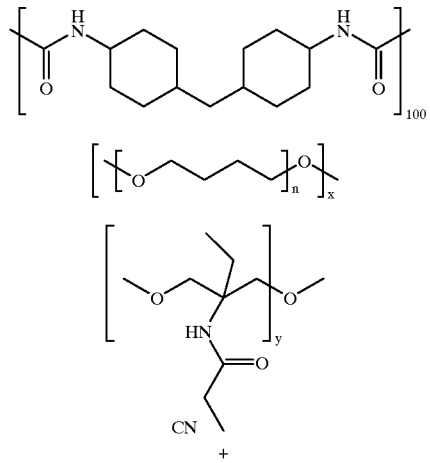

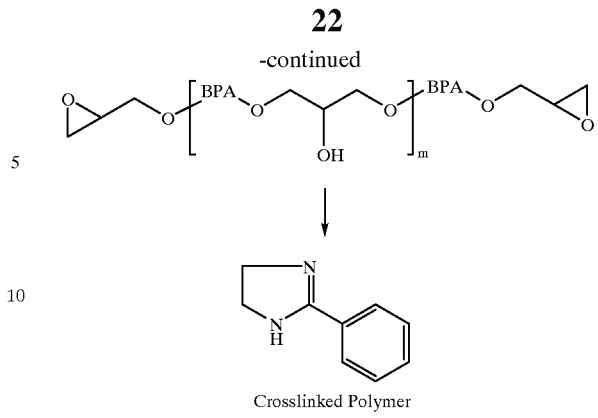

Crosslinked Polymer

Butyraldehyde Crosslinked Polymer Preparation
General Preparation

A linear polyurethane was dissolved in dry THF and butyraldehyde was added dropwise to the solution. PTMG molecular weights of the linear polyurethane varied from 90 to 1000. Molar ratios between the PTMG and the 2-cyanoacetamido reactive moiety were varied from 1:1 to 1:3 with one final example containing no 2-cyanoacetamido reactive moiety. Molar ratios between the 2-cyanoacetamido reactive moiety, the butyraldehyde and the diethylamine were varied from 1.5:1:1.5 to 2:1:2. Diethylamine was dissolved in dry THF and then added to the reaction solution all at once. Reactions were all stirred at room temperature for 1.5 hours. Film samples were prepared by pouring 10 mls of the reaction solution into an open Teflon mold and air drying. All film samples were air dried for 16 hours at room temperature followed by a post cure at 65° C. for 24 hours.

Crosslinking of 2-(2-Cyanoacetamido)-2-alkyl-1, 3-propandiol Polyurethanes with Butyraldehyde

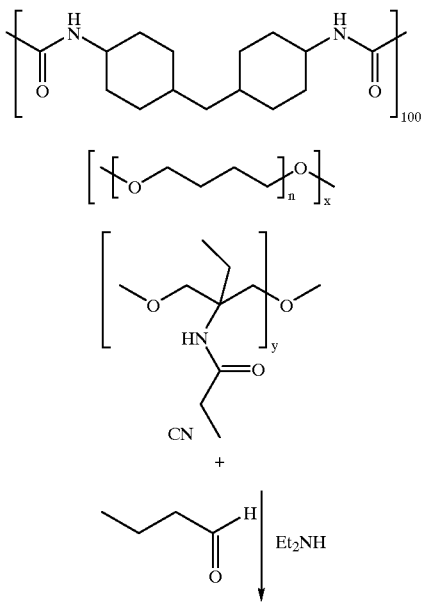

Glycidyl Ether Crosslinked Polymer Preparation
General Preparation

Polyurethane #12, a linear polyurethane presented above, was dissolved in dry THF and glycidyl 1,1,2,2-tetrafluoroethylether was added and the reaction was stirred until solution was obtained. Molar ratios between the 2-cyanoacetamido reactive moiety and the glycidyl ether was varied to include 1:2, 1:4, and 1:5. 2-Phenyl-2-imidazoline was added to the reaction and the reaction was stirred at room temperature. Reaction times were varied from 1.5 hours to 24 hours. Film samples were prepared by pouring 10 mls of the reaction solution into an open Teflon mold. Film drying was carried out at room temperature for 16 hours and a post cure at 65° C. for 16 hours.

Crosslinking of 2-Cyanoacetamidopolyurethanes with Glycidyl 1, 1, 2, 2-tetrafluoroethyl ether

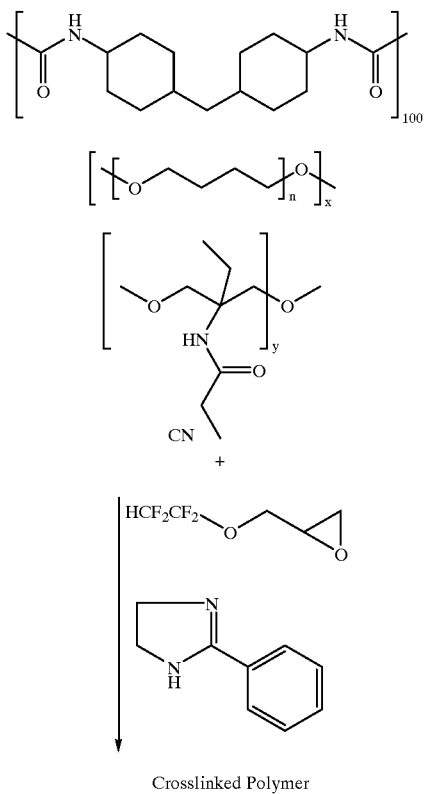

Crosslinked Polymer

EXAMPLE CL-1

To a solution of 1.23 g (1.41 meq) of Polyurethane #12 and 25–30 mls THF was added 3.8 g (7.05 meq) of EPON 1001F™ (Shell) with an additional 15 mls of dry THF. The mixture was stirred for several minutes at room temperature until solution was obtained. Phenyl-2-imidazoline (0.11 g) was added and the reaction mixture was stirred at room temperature for 72 hours.

Sample number one was prepared by placing 10 mls of the resulting clear solution into a Teflon dish and drying at room temperature for sixteen hours, and then drying in an oven at 65° C. for twenty four hours. The yellow sample was then submitted for dynamic mechanical analysis (DMA) and TGA analysis.

Sample number two was prepared by coating the reaction mixture onto an Estar™ (Kodak) film substrate which had been cleaned using a lint-free cloth and ethanol. A 0.005" coating knife was used and the sample was dried at room temperature for sixteen hours, then dried in an oven at 65° C. for twenty four hours. This yellow sample was submitted for Norman abrasion wear testing and surface energy measurements.

EXAMPLE CL-2

To 2.46,g (2.83 meq) of Polyurethane #12 and 25–30 mls of THF and 2.53 g (14.16 meq) of ECN 1138™ (Ciba Geigy) dissolved in 15 mls of THF. The flask was rinsed with 10 mls of THF. The mixture was stirred for several minutes at room temperature. 2-Phenyl-2-imidazoline (0.106 g) was added and the reaction mixture was stirred at room temperature for 72 hours.

Sample number one was prepared by placing 10 mls of the resulting clear solution into a Teflon dish and drying at room temperature for sixteen hours, then drying an oven at 65° C. for twenty four hours. The hazy, white/yellow sample was then submitted for DMA and TGA analysis.

Sample number two was prepared by coating the reaction mixture onto an Estar™ film substrate which had been cleaned using a lint-free cloth and ethanol. A 0.005" coating knife was used and the resulting coating became an hazy white upon the initial evaporation of the solvent. The sample was dried at room temperature for sixteen hours, then dried in an oven at 65° C. for twenty four hours. This yellow sample was submitted for Norman abrasion wear testing and surface energy measurements.

EXAMPLE CL-3

To a solution of 5.0 g (5.75 meq) of Polyurethane #12 and 50 mls THF was added 0.21 g (2.88 meq) of butyraldehyde (Acros) and 0.42 g (5.75 meq) diethylamine dissolved in 10 mls of THF. The mixture was stirred for one and one half hours to give clear and slightly yellow solution.

Sample number one was prepared by placing 10 mls of the resulting clear solution into a Teflon dish and drying at room temperature for sixteen hours, then drying in an oven at 65° C. for twenty four hours. The clear and very lightly yellow sample was then submitted for DMA and TGA analysis.

Sample number two was prepared by coating the reaction mixture onto an Estar™ film substrate which had been cleaned using a lint-free cloth and ethanol. A 0.004" coating knife was used and the sample was dried at room temperature for sixteen hours, then dried in an oven at 65° C. for twenty four hours. This sample was submitted for Norman abrasion wear testing and surface energy measurements.

EXAMPLE CL-4

To a solution of 1.31 g (1.37 meq) of Polyurethane #10 and 40 mls dry THF was added 3.69 g (6.86 meq) EPON 1001F™ (Shell) with 10 mls of dry THF rinse. The mixture was stirred for several minutes at room temperature until solution was obtained. 2-Phenyl-2-imidazoline (0.11 g) was added to the reaction mixture and the mixture was stirred at room temperature for 72 hours.

Sample number one was prepared by placing 10 mls of the resulting clear solution into a Teflon dish and drying at room temperature for sixteen hours, drying in an oven at 65° C. for twenty four hours. The clear yellow sample was then submitted for DMA and TGA analysis.

Sample number two was prepared by coating the reaction mixture onto an Estar™ film substrate which had been cleaned using a lint-free cloth and ethanol. A 0.004" coating knife was used and the sample was dried at room temperature for sixteen hours, then dried in an oven at 65° C. for twenty four hours. This clear yellow sample was submitted for Norman abrasion wear testing and surface energy measurements.

EXAMPLE CL-5

To a solution of 2.59 g (2.70 meq) of Polyurethane #10 and 40 mls of THF was added 2.40 g (13.50 meq) of ECN 1138™ (Ciba Geigy) was dissolved in 15 mls of THF, with 10 mls of THF rinse. The mixture was stirred for several minutes at room temperature. 2-Phenyl-2-imidazoline(0.11 g) was added to the reaction mixture and the mixture was stirred at room temperature for 72 hours.

Sample number one was prepared by placing 10 mls of the resulting clear solution into a Teflon dish and drying at room temperature for sixteen hours, then drying in an oven at 65° C. for twenty four hours. The opaque yellow sample was then submitted for DMA and TGA analysis.

Sample number two was prepared by coating the reaction mixture onto an Estar™ film substrate which had been cleaned using a lint-free cloth and ethanol. A 0.004" coating knife was used and the resulting coating became a clear light yellow upon the initial evaporation of the solvent. The sample was dried at room temperature for sixteen hours, then dried in an oven at 65° C. for twenty four hours. This sample was submitted for Norman abrasion wear testing and surface energy measurements.

EXAMPLE CL-6

To a solution of 5.0 g (5.21 meq) of Polyurethane #10 and 65 mls THF was added. 0.25 g (3.48 meq) of butyraldehyde (Acros) and 0.385 g (5.21 meq) of diethylamine was dissolved in 10 mls THF. The mixture was stirred for one and one half hours. The resulting reaction solution was clear.

Sample number one was prepared by placing 10 mls of the resulting clear solution into a Teflon dish and drying at room temperature for sixteen hours, then drying in an oven at 65° C. for twenty four hours. The clear sample was then submitted for DMA and TGA analysis.

Sample number two was prepared by coating the reaction mixture onto an Estar™ film substrate which had been cleaned using a lint-free cloth and ethanol. A 0.004" coating knife was used and the sample was dried at room temperature for sixteen hours, then drying in an oven at 65° C. for twenty four hours. This sample was submitted for Norman abrasion wear testing and surface energy measurements.

EXAMPLE CL-7

To a solution of 1.15 g (1.43 meq) of Polyurethane #9 in 40 mls dry THF was added 3.85 g (7.17 meq) EPON 1001F™ (Shell) with additional 20 mls of dry THF rinse. The mixture was stirred for several minutes at room temperature until solution was obtained. 2-Phenyl-2-imidazoline (0.10 g) was added the reaction mixture was stirred at room temperature for 72 hours.

Sample number one was prepared by placing 10 mls of the resulting clear solution into a Teflon dish and drying at room temperature for sixteen hours, then drying in an oven at 65° C. for twenty four hours. The resulting film was a hazy light yellow upon oven drying and appeared to be phase separated. The sample was then submitted for DMA and TGA analysis.

Sample number two was prepared by coating the reaction mixture onto an Estar™ film substrate which had been cleaned using a lint-free cloth and ethanol. A 0.004" coating knife was used and the sample was dried at room temperature for sixteen hours, and then dried in an oven at 65° C. for twenty four hours. This hazy light yellow sample was submitted for Norman abrasion wear testing and surface energy measurements.

EXAMPLE CL-8

To a solution of 2.38 g (2.97 meq) of Polyurethane #9 and 40 mls of THF was added 2.70 g (15.12 meq) of ECN 1138™ (Ciba Geigy) dissolved in 15 mls THF with 10 mls THF rinse. 2-Phenyl-2-imidazoline (0.11 g) was added and the reaction mixture was stirred at room temperature for 72 hours.

Sample number one was prepared by placing 10 mls of the resulting clear solution into a Teflon™ dish and drying at room temperature for sixteen hours and then drying in an oven at 65° C. for twenty four hours. The opaque yellow sample was then submitted for DMA and TGA analysis. Sample number two was prepared by coating the reaction mixture onto an Estar™ film substrate which had been cleaned using a lint-free cloth and ethanol. A 0.004™ coating knife was used and the resulting coating, hazy yellow sample was dried at room temperature for sixteen hours and then dried in an oven at 65° C. for twenty four hours. This sample was submitted for Norman abrasion wear testing and surface energy measurements.

EXAMPLE CL-9

To a solution of 5.0 g (6.25 meq) of Polyurethane #9 in 65 mls THF was added 0.23 g (3.13 meq) of butyraldehyde (Acros) and 0.46 g (6.25 meq) of diethylamine dissolved in 10 mls THF. The mixture was stirred at room temperature for one and one half hours.

Sample number one was prepared by placing 10 mls of the resulting clear solution into a Teflon™ dish and drying at room temperature for sixteen hours, then drying in an oven at 65° C. for twenty four hours. The sample was submitted for DMA and TGA analysis.

Sample number two was prepared by coating the reaction mixture onto an Estar™ film substrate which had been cleaned using a lint-free cloth and ethanol. A 0.004" coating knife was used and the sample was dried at room temperature for sixteen hours, then dried in an oven at 65° C. for twenty four hours. This clear sample was submitted for Norman abrasion wear testing and surface energy measurements.

Characterization Methods

Dynamic mechanical analysis (DMA) was run on a Rheometrics Solids Analyzer RSAII. Temperatures varied from −150° C. to 200° C. Samples are initially cooled to −150° C. with a dwell time at 150° C. of 0.1 minute and the samples were run at a rate of 2° C./step. Storage modulus (E'), loss modulus (E") and tan delta were obtained.

Surface energy measurements were done on a Rame-Hart Goniometer model number 100-00-115. Polar and dispersive forces were measured using water and diiodomethane, respectively. The total of the polar and dispersive forces was reported as surface energy (dynes/cm$^2$).

Butyraldehyde Crosslinking

Baseline linear polyurethanes (#13), (#12), (#10), and (#9) were crosslinked with butyraldehyde. The PTMG soft segment molecular weight was varied to include 90, 250 and 1000 molecular weights.

Two factors contributed to the final degree of crosslinking: first, the mole ratio between the 2-cyanoacetamido functionality of the baseline linear polyurethane, the butyraldehyde and the diethylamine. A ratio of 2:1:2 generally produced crosslinking (Ex. CL-9) as evidenced by the appearance of a rubbery plateau in the storage modulus (FIG. 1, B$_2$) compared to a 1.5:1:1.5 ratio producing only a moderate crosslinking (Ex. CL-6) (FIG. 2, B$_2$).

Second, the degree of crosslinking was modified by varying the mole ratio between the PTMG soft segment and the 2-cyanoacetamido functional group of the baseline linear polyurethane. In general, a mole ratio of 99.75:0.25 to 0:100

(with respect to glycol:2-cyanoacetamido segment) is useful, but it was observed that with butyraldehyde crosslinking, a ratio of 1:1 produced only the slightest crosslinking (Polyurethane #13) (FIG. 3) but a ratio of 1:3 (Polyurethane #12) produced a favorable amount of crosslinking (Ex. CL-3) (FIG. 4).

The effect of the PTMG molecular weight is found in the glassy state storage modulus. At 25° C., the lowest PTMG molecular weight of 90 (Ex. CL-9) (FIG. 1) produced the highest E' in the glassy state. The PTMG molecular weight of 250 (FIG. 2) produced the medium E' and the PTMG of molecular weight 1000 (FIG. 3) produced the lowest E'. This was true for the baseline linear polyurethanes as well as for the subsequent crosslinked polymers. An increase of E' was observed in the baseline linear polyurethanes when the PTMG:2cyanoacetamido ratio was varied from 1:1 (FIG. 3) to 1:3 (FIG. 4). The higher 2-cyanoacetamido ratio produced an E' of 0.9 G$\alpha$ relative to the 1:1 ratio with an E' of 0.043 Gpa.

Epoxy Crosslinking

Figure 5:
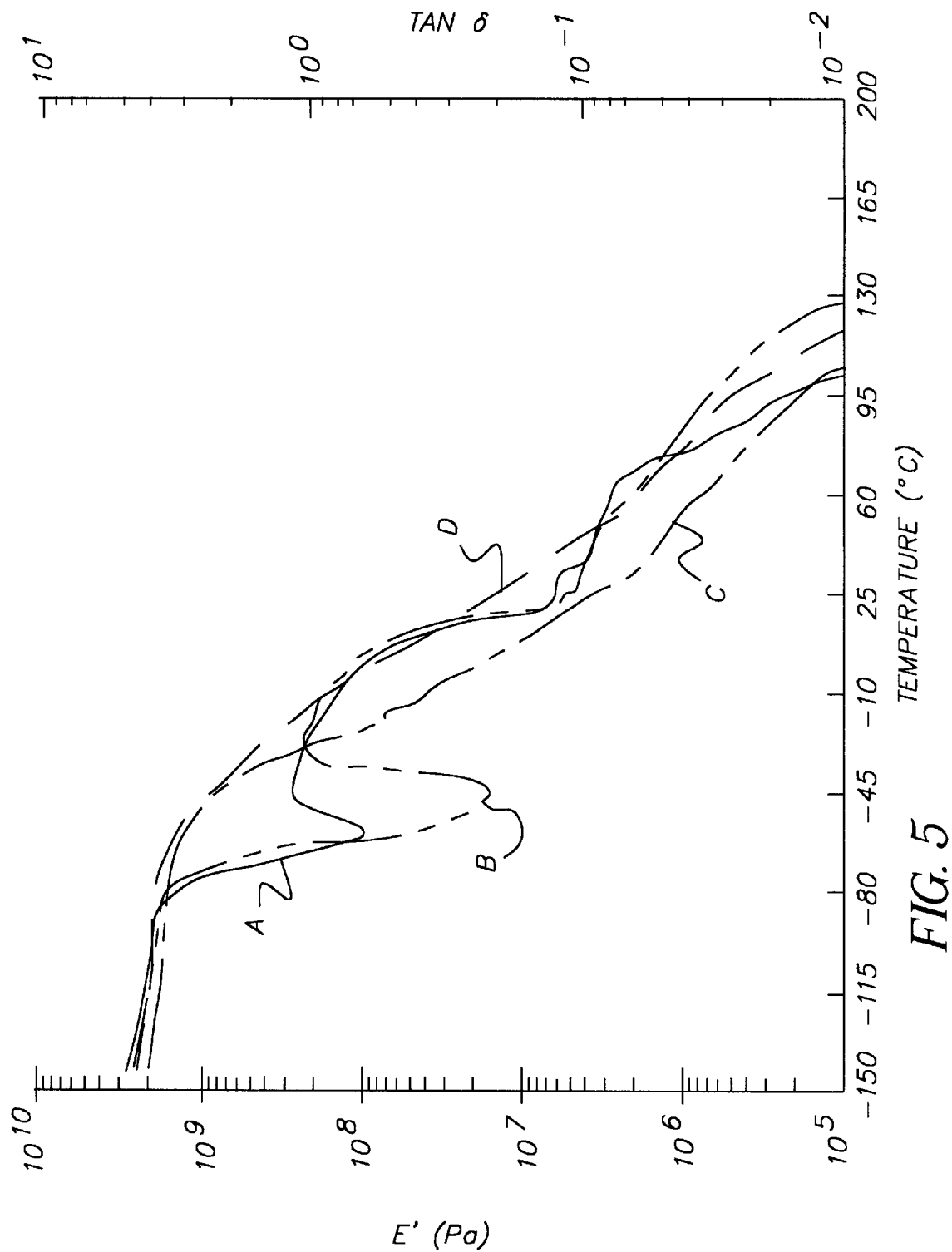

Beginning with the low modulus Polyurethane #15, variations of reaction conditions produced, in one case, a polymer with a higher storage modulus (0.017 Gpa) (FIG. 5).

In both cases where EPON 1001F™ was used, a more typically defined storage and loss modulus curve was observed relative to the Polyurethane #15 control. However, no discernible rubbery plateau was observed. The baseline polymer, Polyurethane #15, with it's 2900 molecular weight PTMG was too soft and crosslinking with the described epoxies did little to improve the storage modulus and thus no usable overcoat candidate were produced.

Figure 6:
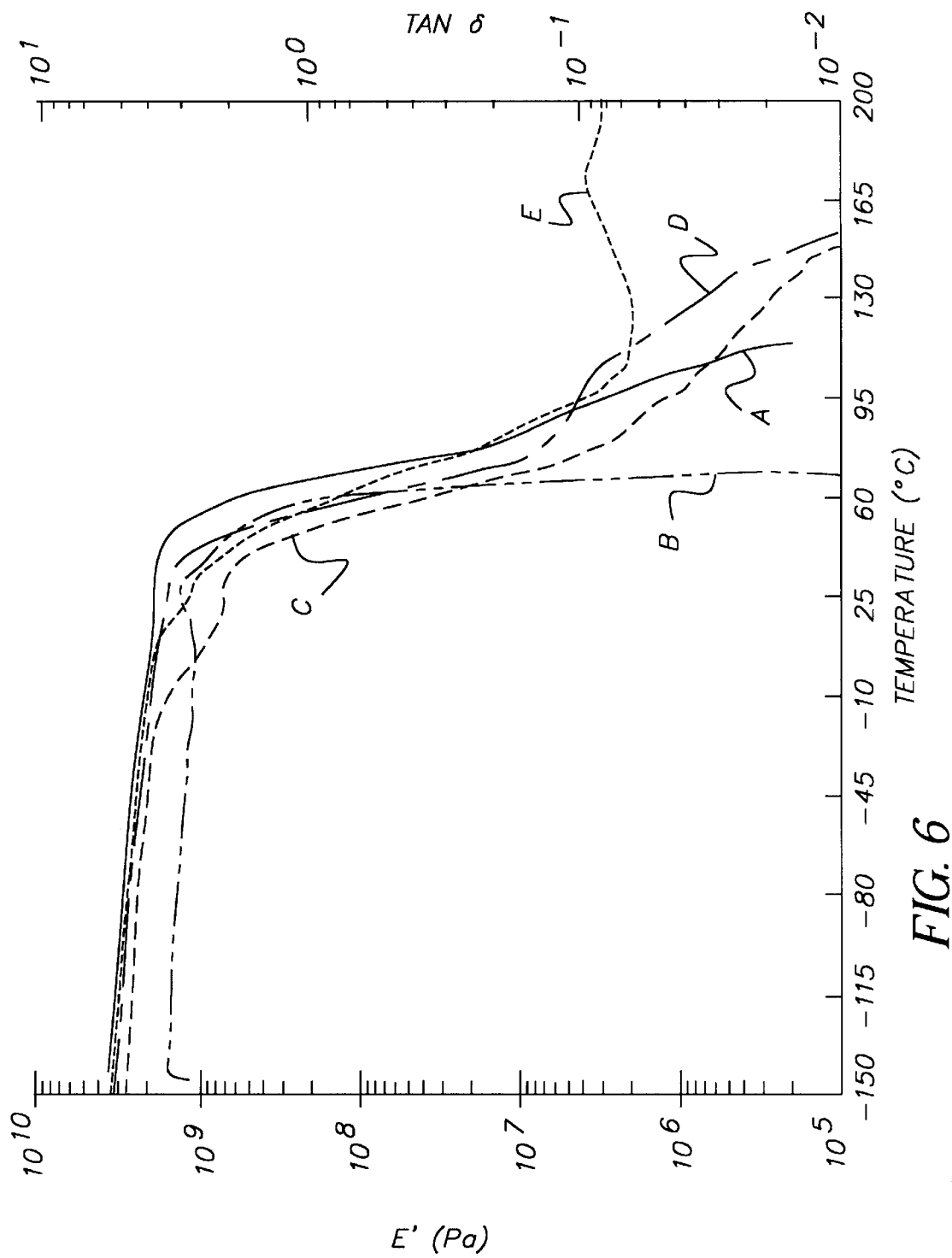

When the PTMG molecular weight equaled 90, as in Polyurethane #9, the baseline polymer begins with a storage modulus of 1.8 Gpa (FIG. 6, A).

Crosslinking was evident when ECN 1138™ was used. A clearly defined rubbery plateau and a sharply defined tan delta are now present (FIG. 6, E). When EPON 1001F™ was used, and although the reaction conditions were identical, the resulting polymer did not produce a usable DMA (FIG. 6, B). Next, we explored the effect of simply mixing the ECN 1138™ with a baseline polymer similar to Polyurethane #9 but devoid of the 2-cyanoacetamido crosslinking site (Polyurethane #16). Reaction conditions similar to those described above were run using ECN 1138™. A control was also run using only the baseline Polyurethane #16 (FIG. 6, D). No rubbery plateau was observed in the sample where the ECN 1138™ was mixed into the baseline polymer Polyurethane #16 (FIG. 6, C). However, several additional transitions were observed in the storage modulus and loss modulus relative to the control suggesting the epoxy portion of the mixture. Self-crosslinking of the ECN 1138™ does not account for the existence of the well defined rubbery plateau in the sample from Example 8. Therefore, we conclude Example CL-8 to be a bona fide crosslinked polymer via the epoxy and 2-cyanocaetamido functionality.

Figure 7:
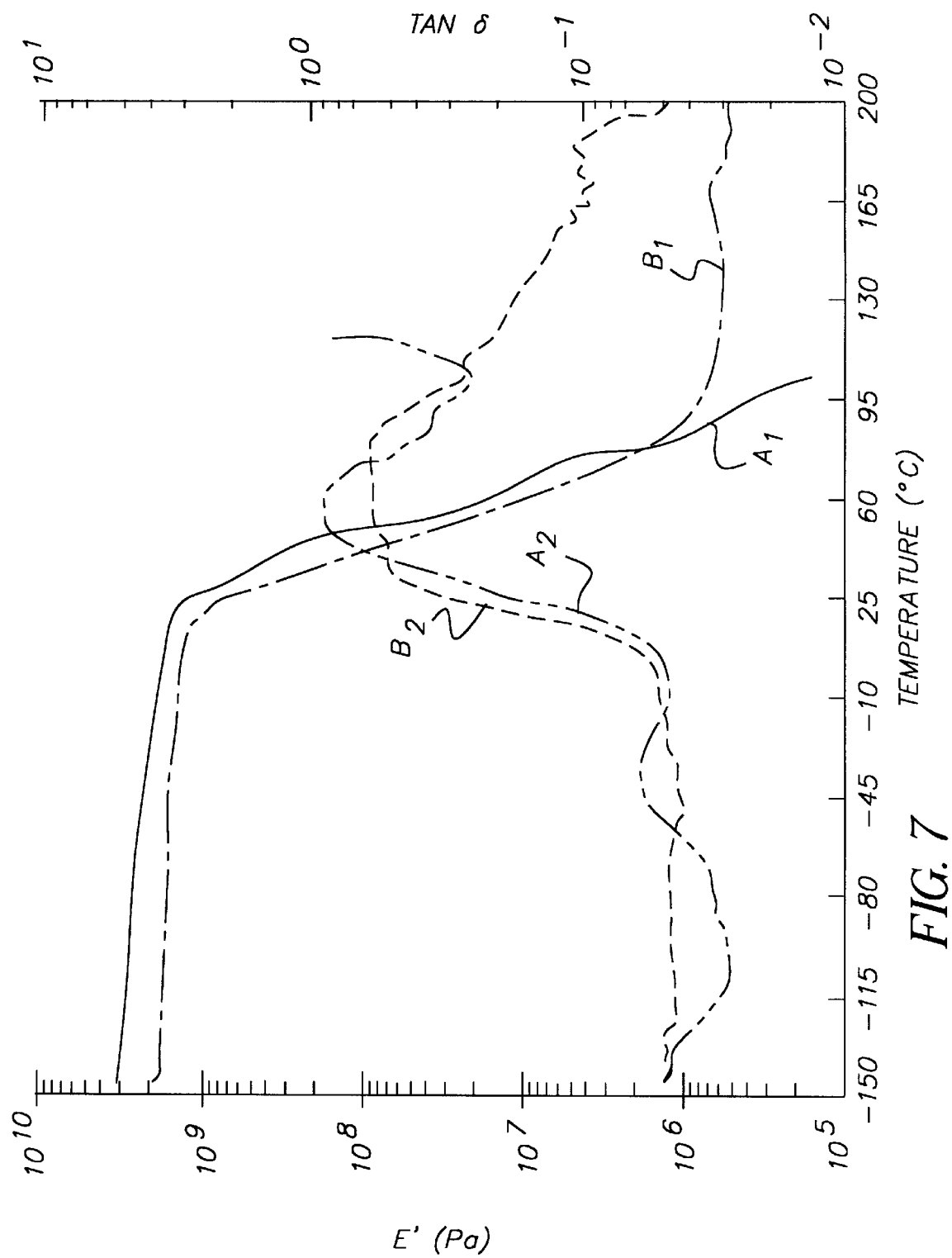

Using the now "established" reactive conditions of room temperature for 72 hours, using the epoxy materials we crosslinked several other baseline polymers with varying glycol molecular weights. Baseline polymer Polyurethane #10 with a PTMG molecular weight of 250 and a mole ratio of 1:1, was used to produce Example CL-4 (FIG. 7, $B_2$). The epoxy was EPON 1001F™. Again, this example clearly shows a rubbery plateau relative to the control.

Figure 8:
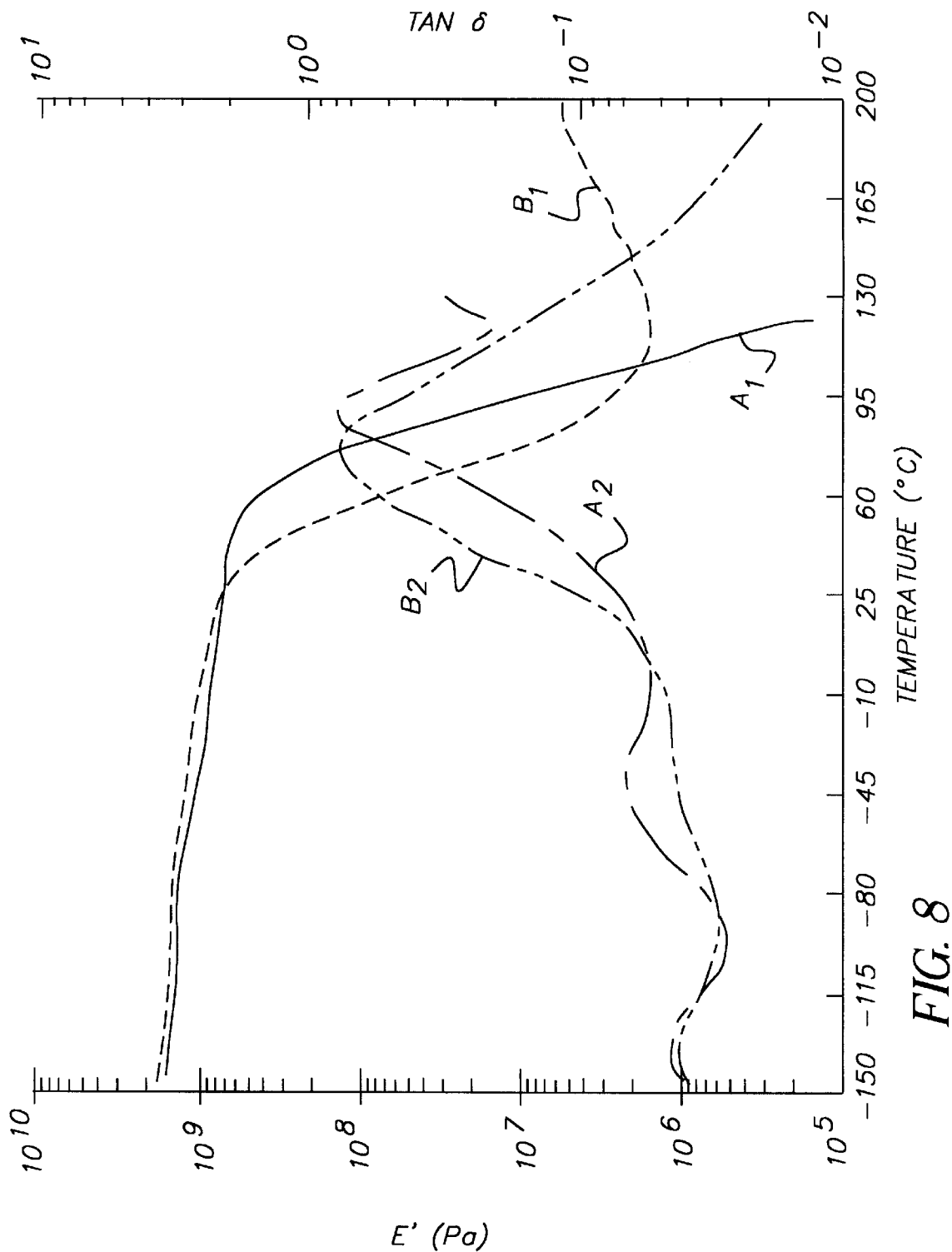

Finally, baseline Polyurethane #12 with a 1:3 ratio of PTMG:cyanoacetamido segment was crosslinked with ECN 1138™ in Example 2. Again crosslinking was observed as a well defined rubbery plateau relative to the linear baseline polymer (FIG. 8, $B_2$).

Epoxy Results

Improved overcoat properties are difficult if not impossible to achieve if the baseline linear polyurethane is too soft. For the epoxy crosslinked section of this report, we focused on those linear baseline polyurethanes that had storage modulii of 0.90 GPa or greater. With one exception, Example 15, which had a storage modulus of 0.010 GPa, in every case crosslinking occurred as evidenced by the appearance of a broad rubbery plateau region. PTMG molecular weights varied from 90 to 250 to 1000. Two baseline polymers maintained a 1:1 mole ratio and one contained a 1:3 mole ratio. Polyurethane #12 was identical to Polyurethane #13 with the exception of the ratio. Polyurethane #12 produced a crosslinked polymer while crosslinking Polyurethane #13 was not attempted based upon the butyraldehyde work which indicated it was too soft as a baseline polymer. Although crosslinking was achieved, all but PTMG-90 examples were too soft for overcoat consideration.

Glycidyl Ether Crosslinking

Figure 9:
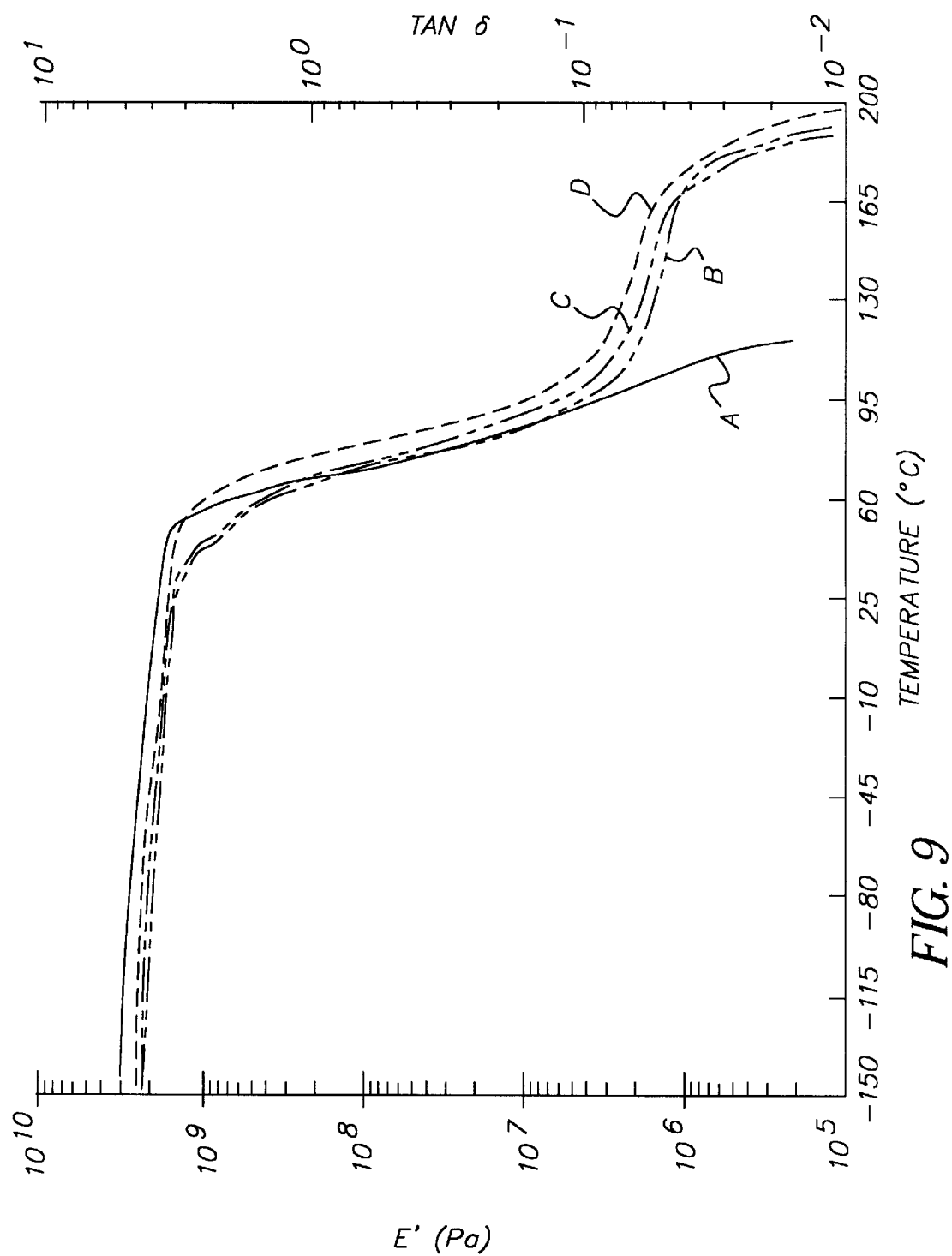

Baseline linear Polyurethane #9 with it's high E' was used exclusively with the glycidyl ether crosslinker. This was based upon the previous butyraldehyde and epoxy crosslinking work. Moderate crosslinking was achieved with longer reaction times (FIG. 9).

TABLE V

| Reference | PTMG Mn | n | $x^a$ | $y^a$ | $Mn^b$ | $Mw^b$ | Mw/Mn |
| --- | --- | --- | --- | --- | --- | --- | --- |
| Polyurethane #5 | | | 0 | 100 | 18,200 | 36,500 | 2.01 |
| Polyurethane #9 | 90 | 1.00 | 50 | 50 | 14,700 | 34,000 | 2.31 |
| Polyurethane #10 | 250 | 3.22 | 50 | 50 | 12,000 | 25,400 | 2.12 |
| Polyurethane #1 | 650 | 8.76 | 50 | 50 | 17,900 | 42,600 | 2.38 |
| Polyurethane #12 | 1000 | 13.62 | 25 | 75 | 13,000 | 27,000 | 2.08 |
| Polyurethane #13 | 1000 | 13.62 | 50 | 50 | 15,200 | 29,700 | 1.95 |
| Polyurethane #14 | 2000 | 27.49 | 50 | 50 | 14,700 | 32,900 | 2.24 |
| Polyurethane #15 | 2900 | 39.97 | 50 | 50 | 15,000 | 30,600 | 2.04 |
| Polyurethane #16 | 90 | 1.0 | 100 | 0 | | | |

$x^a$ = PTMG segment mole percent
$y^a$ = 2-cyanoacetamido segment mole percent
b = PEO equivalent

BRIEF DESCRIPTION AND LEGEND FOR FIGS. 1–9

Figure 2:
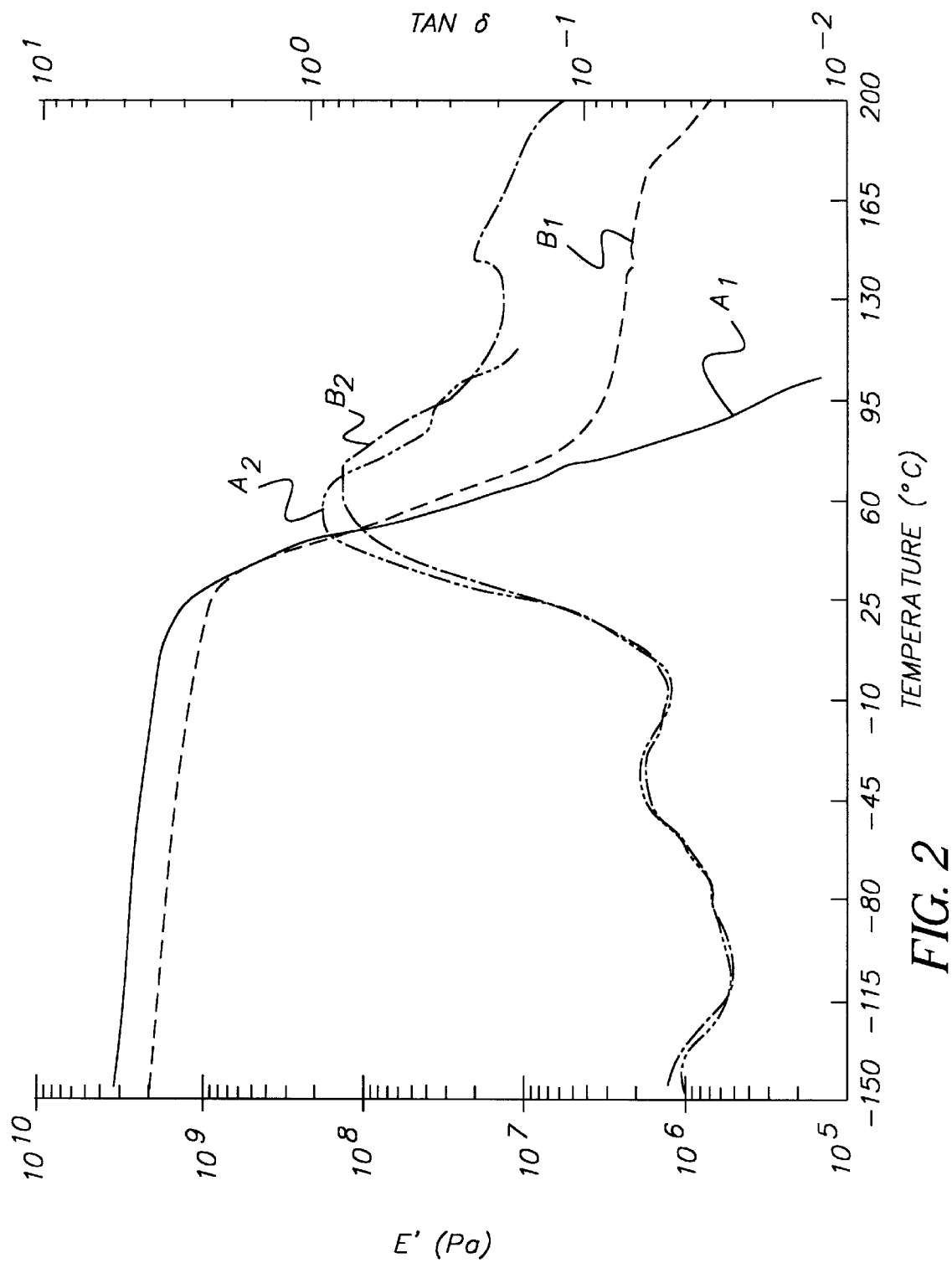

In FIG. 1, $A_1$ represents Polyurethane #9 (E'); $A_2$ represents Polyurethane #9 (tan δ); $B_1$ represents Example CL-9 (E') and $B_2$ represents CL-9 (tan δ).δ). In CL-9, Polyurethane #9 is cross-linked with butyraldehyde.

In FIG. 2, $A_1$ represents Polyurethane #10 (E'); A, represents Polyurethane #10 (tan δ); $B_1$ represents Example CL-6

(E') and B₂represents CL-6 (tan δ). In CL-6, Polyurethane #10 is cross-linked with butyraldehyde.

Figure 3:
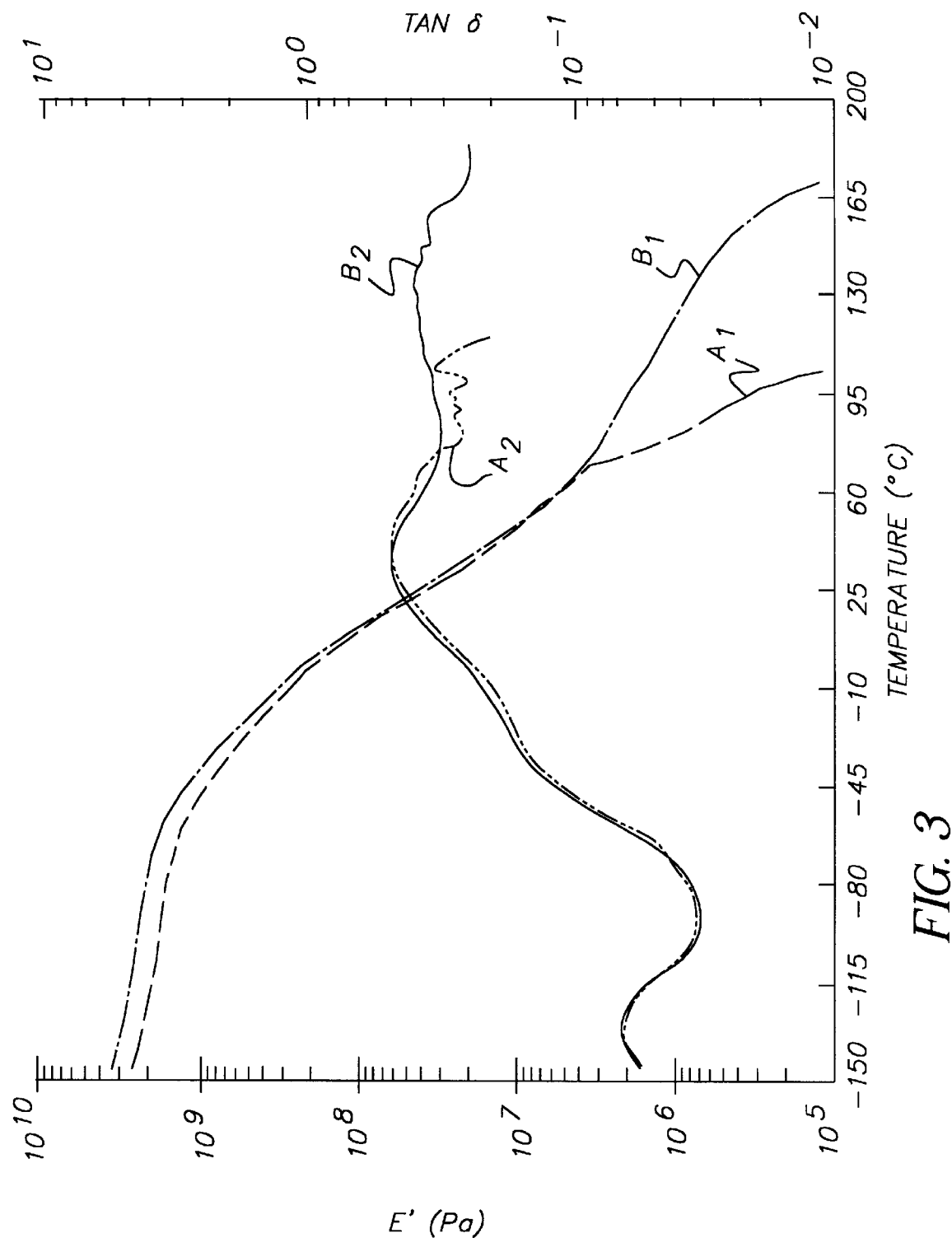
Figure 4:
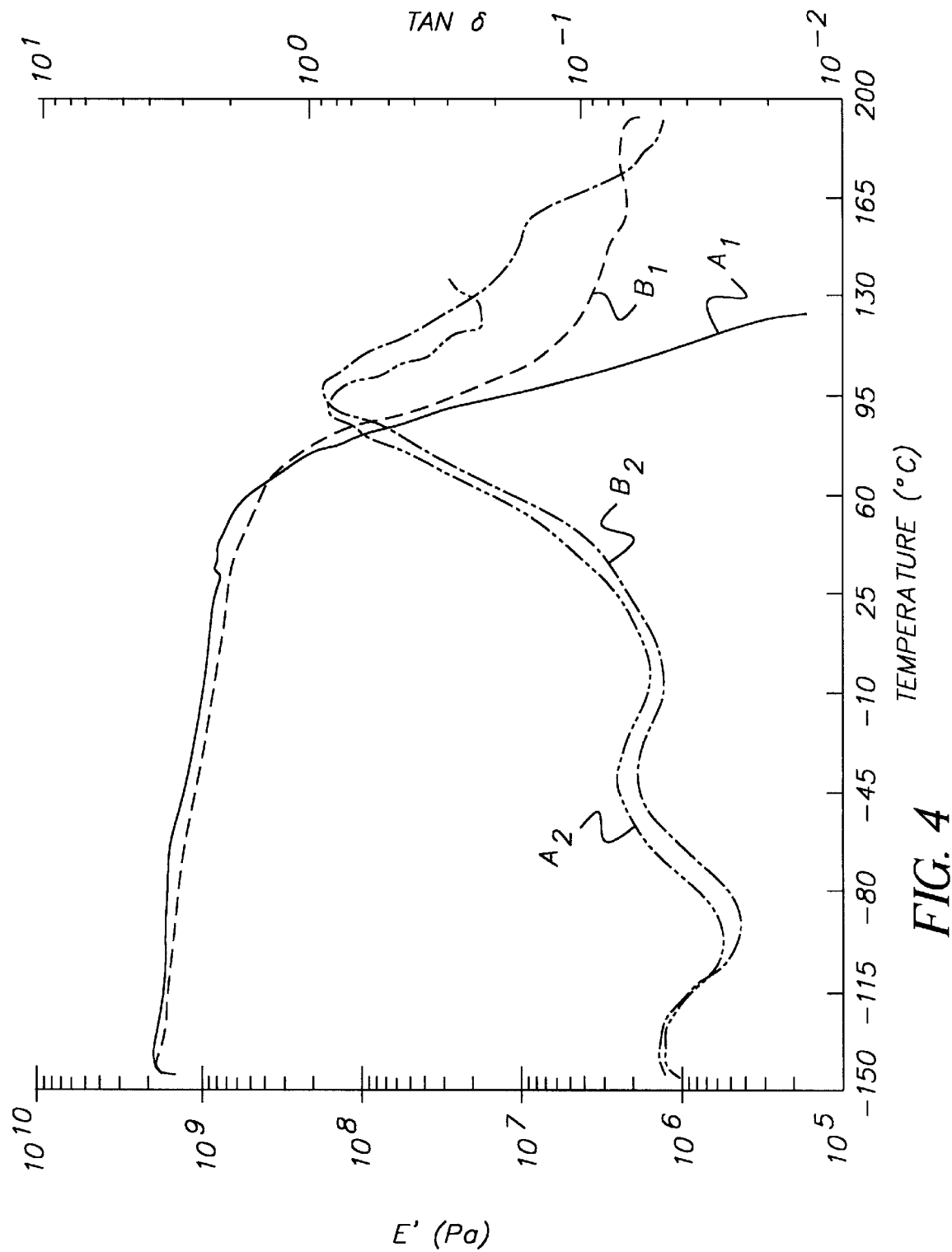

In FIG. 3, A₁ represents Polyurethane #13 (E'); A₂represents Polyurethane #13 (tan δ); B₂ represents Polyurethane #13 with butyraldehyde (tan δ).

In FIG. 4, A₁ represents Polyurethane #12 (E'); A₂ represents Polyurethane #12 (tan δ); B₁ represents Example CL-3 (E') and B₂represents CL-3 (tan δ). In CL-3, Polyurethane #12 is cross-linked with butyraldehyde.

FIG. 5 represents Polyurethane #15 cross-linked with epoxy. No usable candidate was produced.

In FIG. 6, A represents Polyurethane #9; B represents Polyurethane # 9 with EPON; C represents Polyurethane #16 with ECN 1138; D represents Polyurethane #16 without epoxy; and E represents CL-8. In CL-8, Polyurethane #9 is crosslinked with ECN 1138

In FIG. 7, A₁ represents Polyurethane #10 (E'); A₂ represents Polyurethane #10 (tan δ); B₁ represents Example CL-4 (E') and B₂represents CL-4 (tan δ).δ). In CL-4, Polyurethane #10 is cross-linked with EPON 1101F.

In FIG. 8, A₁ represents Polyurethane #12 (E'); A₂ represents Polyurethane #12 (tan δ); B. represents Example CL-2 (E') and B₂ represents CL-2 (tan δ). In CL-2, Polyurethane #12 is cross-linked with EPON 1101F.

FIG. 9 represents Polyurethane #9 (A), cross-linked with glycidyl ether (B, C, D).

The invention has been described in detail with particular reference to certain preferred embodiments thereof, but it will be understood that variations and modifications can be effected within the spirit and scope of the invention.

What is claimed is:

1. A cross-linked polyurethane formed from a polyurethane prepolymer with reactive 2-cyanoacetamido moieties, said prepolymer being cross-linked with an electrophile.

2. A cross-linked polyurethane formed from a polyurethane prepolymer with reactive 2-cyanoacetamido moieties obtained from a reaction mixture of: a) at least one 2-cyanoacetamido-substituted hydroxy compound selected from the group consisting of 2-cyanoacetamido-substituted glycol, 2-cyanoacetamido-substituted aromatic diol, aliphatic or aromatic 2-cyanoacetamido-substituted polyol, and 2-cyanoacetamido-substituted monohydroxy alcohol or phenol with b) at least one diisocyanate or polyisocyanate, said prepolymer being cross-linked with an electrophile.

3. The cross-linked polyurethane of claim 2 wherein the electrophile is selected from epoxides, aliphatic aldehydes and glycidyl ether.

4. The cross-linked polyurethane of claim 3 wherein the epoxide is an epoxy resin.

5. The cross-linked polyurethane of claim 3 wherein the aldehyde is butyraldehyde.

6. The cross-linked polyurethane of claim 3 wherein the glycidyl ether is glycidyl 1,1,2,2-tetrafluoroethyl ether.

7. The cross-linked polyurethane of claim 2 wherein said reaction mixture further comprises a coreactant compound selected from the group consisting of a mono-, di-, or poly-functional alcohol, phenol, aliphatic amine, aromatic amine, aliphatic isocyanate, and aromatic isocyanate.

8. The cross-linked polyurethane of claim 7 wherein said coreactant compound is a difunctional alcohol.

9. The cross-linked polyurethane of claim 7 wherein the polyurethane with reactive 2-cyanoacetamido moieties has a mole ratio of 99.75:0.25 to 0:100 with respect to coreactant compound: 2-cyanoacetamido-substituted compound.

10. The cross-linked polyurethane of claim 9 wherein the mole ratio is 1:3.

11. The cross-linked polyurethane of claim 2 formed in the presence of diethylamine having a mole ratio of 2:1:0.01 to 2:1:100 with respect to 2-cyanoacetamido moiety:electrophile:diethylamine.

12. The cross-linked polyurethane of claim 11 wherein the mole ratio is 2:1:2.

13. The cross-linked polyurethane of claim 2 wherein the polyurethane prepolymer with reactive 2-cyanoacetamido moieties has a molecular weight between 5,000 and 100,000.

14. The cross-linked polyurethane of claim 13 wherein the polyurethane prepolymer with reactive 2-cyanoacetamido moieties has a molecular weight between 20,000 and 50,000.

15. A method of making a cross-linked polyurethane comprising the steps of:

a) providing a polyurethane prepolymer with reactive 2-cyanoacetamido moieties;

b) providing an electrophile; and c) reacting the polyurethane prepolymer and the electrophile to form a cross-linked polyurethane;

wherein the polyurethane prepolymer with reactive 2-cyanoacetamido moieties is formed from a reaction mixture of: a) at least one 2-cyanoacetamido-substituted hydroxy compound selected from the group consisting of 2-cyanoacetamido-substituted glycol, 2-cyanoacetamido-substituted aromatic diol, aliphatic or aromatic 2-cyanoacetamido-substituted polyol, and 2-cyanoacetamido-substituted monohydroxy alcohol or phenol with b) at least one diisocyanate or polyisocyanate.

16. The method of claim 15, wherein the electrophile is selected from epoxides, aldehydes and glycidyl ether.

* * * * *